United States Patent

Lyu et al.

(10) Patent No.: US 10,797,831 B2
(45) Date of Patent: Oct. 6, 2020

(54) CONTROL INFORMATION SENDING METHOD, CONTROL INFORMATION RECEIVING METHOD, USER EQUIPMENT, AND NETWORK DEVICE

(71) Applicant: Huawei Technologies Co., Ltd., Shenzhen (CN)

(72) Inventors: Yongxia Lyu, Beijing (CN); Lei Guan, Beijing (CN); Zhiyu Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 15/916,536

(22) Filed: Mar. 9, 2018

(65) Prior Publication Data

US 2018/0198569 A1 Jul. 12, 2018

Related U.S. Application Data

(63) Continuation of application No. PCT/CN2015/089470, filed on Sep. 11, 2015.

(51) Int. Cl.
*H04L 1/18* (2006.01)
*H04L 1/00* (2006.01)
(Continued)

(52) U.S. Cl.
CPC .......... *H04L 1/1812* (2013.01); *H04B 7/0626* (2013.01); *H04L 1/0026* (2013.01);
(Continued)

(58) Field of Classification Search
CPC ... H04L 1/1812; H04L 1/1896; H04L 5/0055; H04B 7/0626; H04W 74/002;
(Continued)

(56) References Cited

U.S. PATENT DOCUMENTS

2008/0287155 A1* 11/2008 Xu .............. H04L 5/0007
455/522
2010/0098012 A1* 4/2010 Bala ............ H04L 5/001
370/329
(Continued)

FOREIGN PATENT DOCUMENTS

CN 103095398 A 5/2013
CN 103178926 A 6/2013
(Continued)

OTHER PUBLICATIONS

Samsung, "Coding and RE mapping for multiple UCI for eCA," 3GPP TSG RAN WG1 #82, R1-154113, Beijing, China, Aug. 24-28, 2015, 3 pages.

(Continued)

*Primary Examiner* — Warner Wong
(74) *Attorney, Agent, or Firm* — Slater Matsil, LLP

(57) ABSTRACT

Embodiments disclose a control information sending method, a control information receiving method, user equipment, and a network device. The sending method includes: obtaining a resource occupied by first uplink control information UCI, and obtaining a resource occupied by second UCI; performing channel encoding on the first UCI according to the resource occupied by the first UCI, to obtain an encoded bit sequence of the first UCI, and performing channel encoding on the second UCI according to the resource occupied by the second UCI, to obtain an encoded bit sequence of the second UCI; mapping the encoded bit sequence of the first UCI and the encoded bit sequence of the second UCI to a physical uplink channel; and sending the physical uplink channel.

24 Claims, 6 Drawing Sheets

(51) Int. Cl.
*H04B 7/06* (2006.01)
*H04L 5/00* (2006.01)
*H04W 72/04* (2009.01)
*H04W 72/12* (2009.01)

(52) U.S. Cl.
CPC .......... *H04L 1/0073* (2013.01); *H04L 1/1864* (2013.01); *H04L 5/0055* (2013.01); *H04W 72/0413* (2013.01); *H04W 72/1268* (2013.01)

(58) Field of Classification Search
CPC ......... H04W 72/1268; H04W 72/1284; H04W 72/004; H04W 72/0413; H04W 72/0406; H04W 72/1278
See application file for complete search history.

(56) References Cited

U.S. PATENT DOCUMENTS

| | | | |
|---|---|---|---|
| 2010/0272019 A1* | 10/2010 | Papasakellariou | H04B 7/0417 370/328 |
| 2011/0080880 A1* | 4/2011 | Yin | H04B 7/0682 370/329 |
| 2011/0242997 A1* | 10/2011 | Yin | H04L 1/0031 370/252 |
| 2011/0268045 A1* | 11/2011 | Heo | H04L 1/0027 370/329 |
| 2012/0033587 A1* | 2/2012 | Papasakellariou | H04J 13/00 370/277 |
| 2012/0120817 A1* | 5/2012 | Khoshnevis | H04L 1/0026 370/252 |
| 2012/0127869 A1* | 5/2012 | Yin | H04L 1/0031 370/252 |
| 2012/0213176 A1* | 8/2012 | Kwak | H04L 1/0026 370/329 |
| 2012/0230268 A1* | 9/2012 | Marinier | H04B 7/0626 370/329 |
| 2013/0039334 A1* | 2/2013 | Han | H04L 5/0007 370/330 |
| 2013/0064228 A1* | 3/2013 | Jang | H04L 5/0053 370/335 |
| 2013/0083867 A1* | 4/2013 | Frenne | H04B 7/08 375/308 |
| 2013/0322391 A1* | 12/2013 | Yang | H04L 5/001 370/329 |
| 2013/0343322 A1* | 12/2013 | Lee | H04B 7/2656 370/329 |
| 2014/0056278 A1* | 2/2014 | Marinier | H04W 72/044 370/330 |
| 2014/0092865 A1* | 4/2014 | Heo | H04L 41/069 370/331 |
| 2014/0161060 A1* | 6/2014 | Nam | H04L 5/0055 370/329 |
| 2014/0233419 A1* | 8/2014 | Cheng | H04L 5/0053 370/252 |
| 2014/0233517 A1 | 8/2014 | Seo et al. | |
| 2014/0269600 A1* | 9/2014 | Lee | H04L 5/0007 370/329 |
| 2014/0293921 A1 | 10/2014 | Tang et al. | |
| 2014/0301324 A1 | 10/2014 | Cheng et al. | |
| 2015/0043470 A1* | 2/2015 | Hwang | H04W 72/0413 370/329 |
| 2015/0156762 A1* | 6/2015 | Hwang | H04L 1/1671 370/311 |
| 2016/0192388 A1* | 6/2016 | Ekpenyong | H04W 72/1284 370/329 |
| 2017/0164360 A1* | 6/2017 | Kim | H04L 5/0026 |
| 2017/0170931 A1* | 6/2017 | Kusashima | H04L 1/1867 |

FOREIGN PATENT DOCUMENTS

| | | |
|---|---|---|
| CN | 103188033 A | 7/2013 |
| CN | 103828318 A | 5/2014 |
| EP | 2706715 A2 | 3/2014 |
| EP | 2787674 A1 | 10/2014 |

OTHER PUBLICATIONS

HTC et al.,"Multiplexing of CSI reports for DL CoMP," 3GPP TSG-RAN WG1 #70 R1-123594, Qingdao, China, Aug. 13-17, 2012, 6 pages.

* cited by examiner

CONTROL INFORMATION SENDING METHOD, CONTROL INFORMATION RECEIVING METHOD, USER EQUIPMENT, AND NETWORK DEVICE

CROSS-REFERENCE TO RELATED APPLICATIONS

This application is a continuation of International Application No. PCT/CN2015/089470, filed on Sep. 11, 2015, the disclosure of which is hereby incorporated by reference in its entirety.

TECHNICAL FIELD

The present invention relates to the field of communications technologies, and in particular, to a control information sending method, a control information receiving method, user equipment, and a network device.

BACKGROUND

In a Long Term Evolution Advanced (LTE-A) system, because a carrier aggregation technology is introduced, when UE simultaneously uses a plurality of downlink component carriers to receive downlink data, the UE needs to feed back channel state information of each downlink component carrier in an uplink direction. The UE also needs to feed back, in the uplink direction, hybrid automatic repeat request-acknowledgment information for data scheduled on each downlink component carrier. Therefore, the channel state information and the hybrid automatic repeat request-acknowledgment information need to be simultaneously reported in one uplink subframe. The channel state information that needs to be reported may be corresponding to one or more downlink carriers, and the hybrid automatic repeat request-acknowledgment information that needs to be reported may correspond to one or more downlink carriers.

The channel state information (CSI) includes periodic CSI and aperiodic CSI. Periodic CSI on a PUCCH is corresponding to a plurality of report types, and different report types are corresponding to different report content. Different periodic CSI report types are corresponding to different report content, and different report content is corresponding to different performance target requirements. Therefore, different periodic CSI report types are corresponding to different performance target requirements. A base station semi-statically configures a report mode, a report period, and a subframe offset of periodic CSI of each carrier by using higher layer signaling. The user equipment determines, according to the report mode indicated by the higher layer signaling, a report type corresponding to CSI that needs to be reported, and determines a report moment of each report type of CSI according to the report period and the subframe offset indicated by the higher layer signaling. For each carrier, only one report type of CSI is reported at one report moment. Periodic CSI of different carriers may have a same report mode or different report modes. However, in a carrier aggregation scenario, channel state information of a plurality of downlink carriers may need to be reported in one subframe. Therefore, different report types of CSI of different carriers may be reported in one subframe.

With further evolution of LTE technologies, to support a 32-carrier aggregation scenario is currently being considered. In the LTE-R11 release, periodic CSI of one carrier and a hybrid automatic repeat request-acknowledgment message (HARQ-ACK) can be jointly encoded and transmitted on a physical uplink control channel (PUCCH). However, in a carrier aggregation scenario of the LTE-R13 release, channel state information of more than one carrier and hybrid automatic repeat request-acknowledgment information need to be simultaneously reported in one uplink subframe. When the channel state information that is of the more than one carrier and that needs to be reported corresponds to a plurality of downlink carriers, periodic CSI corresponding to the downlink carriers may have a same report type or different report types. The hybrid automatic repeat request-acknowledgment information that needs to be reported may also correspond to one or more downlink carriers. However, different report types of CSI are corresponding to different performance target requirements, and a periodic CQI/PMI and the hybrid automatic repeat request-acknowledgment information correspond to different performance target requirements. Therefore, how to ensure that different report types of CSI and the hybrid automatic repeat request-acknowledgment information all meet performance requirements is a problem that needs to be resolved. In a solution, all to-be-transmitted uplink control information including all CSI corresponding to a plurality of carriers and corresponding HARQ-ACKs is jointly encoded, and is transmitted in a corresponding subframe by using more resources or at higher transmit power, so that uplink control information (UCI) with a relatively high performance target requirement can meet a performance target, that is, UCI with a low performance target requirement is used as UCI with a high performance target requirement for transmission.

However, in this solution, in order that UCI with a relatively high performance target requirement can also meet a performance target, the user equipment uses higher transmit power to send UCI, but for UCI with a relatively low performance target requirement, the transmit power is excessively high. Consequently, transmit power of the user equipment is wasted, and power utilization is not high. This solution is not applicable to user equipment with limited power. If user equipment has limited power, the user equipment cannot increase transmit power. Therefore, UCI with a relatively high performance target requirement cannot meet a performance requirement by increasing transmit power.

SUMMARY

Embodiments of the present invention provide a control information sending method, a control information receiving method, user equipment, and a network device, so that different UCI meets respective performance target requirements, and transmit power is not increased according to UCI with a highest performance requirement.

According to a first aspect, a control information sending method is provided. The method includes obtaining a resource occupied by first uplink control information (UCI), and obtaining a resource occupied by second UCI. The method also includes performing channel encoding on the first UCI according to the resource occupied by the first UCI, to obtain an encoded bit sequence of the first UCI, and performing channel encoding on the second UCI according to the resource occupied by the second UCI, to obtain an encoded bit sequence of the second UCI. The first UCI includes CSI of a first report type and a hybrid automatic repeat request-acknowledgment message HARQ-ACK, and the second UCI includes CSI of a second report type; or the first UCI includes a hybrid automatic repeat request-acknowledgment message HARQ-ACK, and the second UCI includes CSI of a first report type and/or CSI of a second report type. The method also includes mapping the encoded bit sequence of the first UCI and the encoded bit sequence of the second UCI to a physical uplink channel. The method also includes sending the physical uplink channel.

With reference to the first aspect, in a first possible implementation of the first aspect, the resource is a quantity of modulation symbols. The performing channel encoding on the first UCI according to the resource occupied by the first UCI, to obtain an encoded bit sequence of the first UCI, and performing channel encoding on the second UCI according to the resource occupied by the second UCI, to obtain an encoded bit sequence of the second UCI includes: obtaining, according to a quantity of modulation symbols occupied by the first UCI, a quantity of encoded bits occupied by the first UCI, and obtaining, according to a quantity of modulation symbols occupied by the second UCI, a quantity of encoded bits occupied by the second UCI; and performing channel encoding on the first UCI according to the quantity of encoded bits occupied by the first UCI, to obtain the encoded bit sequence of the first UCI, and performing channel encoding on the second UCI according to the quantity of encoded bits occupied by the second UCI, to obtain the encoded bit sequence of the second UCI.

With reference to the first possible implementation of the first aspect, in a second possible implementation of the first aspect, the obtaining a resource occupied by first UCI includes: determining, in one of the following manners, the quantity $Q$ of modulation symbols occupied by the first UCI: $Q'_1 = \lceil Q'^*(O_1/(O_1+O_2))^* \beta_{offset} \rceil$, $Q'_1 = M_{sc}^{PUCCH} * N_{symb}^{UCI1}$, or $Q'_1 = \lfloor Q'^*(O_1/(O_1+O_2))^* \beta_{offset} \rfloor$; and the obtaining a resource occupied by second UCI includes: determining, in one of the following manners, the quantity $Q'_2$ of modulation symbols occupied by the second UCI: $Q'_2 = Q' - Q_1$ or $Q'_2 = M_{sc}^{PUCCH} * N_{symb}^{UCI2}$, where $O_1$ is a quantity of information bits of the to-be-transmitted first UCI, $O_2$ is a quantity of information bits of the to-be-transmitted second UCI, $Q'$ is a capacity of the physical uplink channel, $Q' = M_{sc}^{PUCCH} * N_{symb}^{PUCCH}$, $M_{sc}^{PUCCH}$ is a quantity of subcarriers allocated to the physical uplink channel, $M_{sc}^{PUCCH} = 12 * N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH} = (2 \cdot N_{symb}^{UL} - N_{DMRS} - N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, and $N_{symb}^{UCI2}$ is a quantity of time domain symbols used to transmit the second UCI.

With reference to the second possible implementation of the first aspect, in a third possible implementation of the first aspect, the obtaining, according to a quantity of modulation symbols occupied by the first UCI, a quantity of encoded bits occupied by the first UCI includes: obtaining, in the following manner, the quantity of encoded bits occupied by the first UCI:

$Q = Q'_1 * Q_m$; and obtaining, according to a quantity of modulation symbols occupied by the second UCI, a quantity of encoded bits occupied by the second UCI includes: obtaining, in the following manner, the quantity of encoded bits occupied by the second UCI: $Q_2 = Q'_2 * Q_m$, where $Q'_1$ is the quantity of modulation symbols occupied by the first UCI, $Q'_2$ is the quantity of modulation symbols occupied by the second UCI, and $Q_m$ is a modulation order.

With reference to the first aspect, in a fourth possible implementation of the first aspect, the resource is a quantity of encoded bits. The performing channel encoding on the first UCI according to the resource occupied by the first UCI, to obtain an encoded bit sequence of the first UCI, and performing channel encoding on the second UCI according to the resource occupied by the second UCI, to obtain an encoded bit sequence of the second UCI includes: performing channel encoding on the first UCI according to a quantity of encoded bits occupied by the first UCI, to obtain the encoded bit sequence of the first UCI, and performing channel encoding on the second UCI according to a quantity of encoded bits occupied by the second UCI, to obtain the encoded bit sequence of the second UCI.

With reference to the fourth possible implementation of the first aspect, in a fifth possible implementation of the first aspect, the obtaining a resource occupied by first UCI includes: obtaining, in the following manner, the quantity $Q_1$ of encoded bits occupied by the first UCI: $Q_1 = \lceil Q'^*(O_1/(O_1+O_2))^* \beta_{offset} \rceil$ or $Q_1 = M_{sc}^{PUCCH} * N_{symb}^{UCI1}$; and obtaining a resource occupied by second UCI includes: obtaining, in the following manner, the quantity $Q_2$ of encoded bits occupied by the second UCI: $Q_2 = Q - Q_1$ or $Q_2 = M_{sc}^{PUCCH} * N_{symb}^{UCI2}$, where $O_1$ is a quantity of information bits of the to-be-transmitted first UCI, $O_2$ is a quantity of information bits of the to-be-transmitted second UCI, $Q$ is a capacity of the physical uplink channel, $Q = M_{sc}^{PUCCH} * N_{symb}^{PUCCH} * Q_m$, $M_{sc}^{PUCCH}$ is a quantity of subcarriers allocated to the physical uplink channel, $M_{sc}^{PUCCH} = 12 * N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH} = (2 \cdot N_{symb}^{UL} - N_{DMRS} - N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ a quantity of time domain symbols used to transmit the first UCI, $N_{symb}^{UCI2}$ is a quantity of time domain symbols used to transmit the second UCI, and $Q_m$ is a modulation order.

With reference to any one of the first aspect, or the first to the fifth possible implementations of the first aspect, in a sixth possible implementation of the first aspect, the mapping the encoded bit sequence of the first UCI and the encoded bit sequence of the second UCI to a physical uplink channel includes: converting the encoded bit sequence of the first UCI into an encoded vector sequence of the first UCI, and converting the encoded bit sequence of the second UCI into an encoded vector sequence of the second UCI; interleaving the encoded vector sequence of the first UCI and the encoded vector sequence of the second UCI, to obtain an encoded bit sequence of UCI; and mapping the encoded bit sequence of the UCI to the physical uplink channel.

With reference to the sixth possible implementation of the first aspect, in a seventh possible implementation of the first aspect, the interleaving the encoded vector sequence of the first UCI and the encoded vector sequence of the second UCI, to obtain an encoded bit sequence of UCI includes: writing the encoded vector sequence of the first UCI into a matrix row by row; writing, row by row, the encoded vector sequence of the second UCI into a location, in the matrix, other than a location into which the encoded vector sequence of the first UCI is written; and sequentially reading encoded bits in columns of the matrix column by column, to obtain the encoded bit sequence of the UCI.

With reference to any one of the first aspect, or the first to the fifth possible implementations of the first aspect, in an eighth possible implementation of the first aspect, the mapping the encoded bit sequence of the first UCI and the encoded bit sequence of the second UCI to a physical uplink channel includes: modulating the encoded bit sequence of the first UCI and the encoded bit sequence of the second UCI, to obtain an encoded vector sequence, or modulating the encoded bit sequence of the first UCI and the encoded bit sequence of the second UCI, to obtain an encoded vector sequence of the first UCI and an encoded vector sequence of the second UCI respectively; and mapping the encoded vector sequence, or the encoded vector sequence of the first UCI and the encoded vector sequence of the second UCI to the physical uplink channel in a frequency domain-first and time domain-last manner or in a time domain-first and frequency domain-last manner.

With reference to any one of the first aspect, or the first to the eighth possible implementations of the first aspect, in a ninth possible implementation of the first aspect, the CSI of the first report type includes at least one of the following: a type 3, a type 5, a type 6, a type 2a, or periodic CSI used for beam indication. The CSI of the second report type includes at least one of the following: a type 2, a type 2b, a type 2c, a type 4, a type 1, or a type 1a.

With reference to any one of the first aspect, or the first to the ninth possible implementations of the first aspect, in a tenth possible implementation of the first aspect, the first UCI further includes a scheduling request SR.

According to a second aspect, a control information receiving method is provided. The method includes receiving a physical uplink channel. The method also includes obtaining an encoded bit sequence of first UCI and an encoded bit sequence of second UCI on the physical uplink channel. The method also includes obtaining a resource occupied by the first uplink control information UCI, and obtaining a resource occupied by the second UCI. The method also includes performing channel decoding on the encoded bit sequence of the first UCI according to the resource occupied by the first UCI, to obtain the first UCI, and performing channel decoding on the encoded bit sequence of the second UCI according to the resource occupied by the second UCI, to obtain the second UCI. The first UCI includes CSI of a first report type and a hybrid automatic repeat request-acknowledgment message (HARQ-ACK), and the second UCI includes CSI of a second report type; or the first UCI includes a hybrid automatic repeat request-acknowledgment message (HARQ-ACK), and the second UCI includes CSI of a first report type and/or CSI of a second report type.

With reference to the second aspect, in a first possible implementation of the second aspect, the resource is a quantity of modulation symbols. The performing channel decoding on the encoded bit sequence of the first UCI according to the resource occupied by the first UCI, to obtain the first UCI, and performing channel decoding on the encoded bit sequence of the second UCI according to the resource occupied by the second UCI, to obtain the second UCI includes: obtaining, according to the resource occupied by the first UCI, modulation symbols corresponding to the first UCI on the physical uplink channel, and obtaining, according to the resource occupied by the second UCI, modulation symbols corresponding to the second UCI on the physical uplink channel; and performing channel decoding on the first UCI according to the modulation symbols corresponding to the first UCI, to obtain the first UCI transmitted by UE, and performing channel decoding on the second UCI according to the modulation symbols corresponding to the second UCI, to obtain the second UCI transmitted by the UE.

With reference to the first possible implementation of the second aspect, in a second possible implementation of the second aspect, the obtaining a resource occupied by the first UCI includes: determining, in one of the following manners, a quantity $Q'_1$ of modulation symbols occupied by the first UCI:

$$Q'_1 = \lceil Q'^*(O_1/(O_1+O_2))^*\beta_{offset} \rceil,$$
$$Q'_1 = M_{sc}^{PUCCH} * N_{symb}^{UCI1}, \text{ or } Q'_1 = \lceil Q'^* (O_1+O_2)^*\beta_{offset} \rceil; \text{ and}$$

obtaining a resource occupied by the second UCI includes: determining, in one of the following manners, a quantity $Q'_2$ of modulation symbols occupied by the second UCI:

$$Q'_2 = Q' - Q'_1 \text{ or } Q'_2 = M_{sc}^{PUCCH} * N_{symb}^{UCI2},$$
where $O_1$ is a quantity of information bits of the to-be-transmitted first UCI, $O_2$ is a quantity of information bits of the to-be-transmitted second UCI, $Q'$ is a capacity of the physical uplink channel, $Q' = M_{sc}^{PUCCH} * N_{symb}^{PUCCH}$, $M_{sc}^{PUCCH}$ is a quantity of subcarriers allocated to the physical uplink channel, $M_{sc}^{PUCCH} = 12 * N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH} = (2 \cdot N_{symb}^{UL} - N_{DMRS} - N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, and $N_{symb}^{UCI2}$ is a quantity of time domain symbols used to transmit the second UCI.

With reference to the second possible implementation of the second aspect, the method includes: obtaining, in the following manner, a quantity of encoded bits occupied by the first UCI:

$$Q_1 = Q'_1 * Q_m; \text{ and}$$

obtaining, in the following manner, a quantity of encoded bits occupied by the second UCI:

$$Q_2 = Q'_2 * Q_m, \text{ where}$$

$Q'_1$ is the quantity of modulation symbols occupied by the first UCI, $Q'_2$ is the quantity of modulation symbols occupied by the second UCI, and $Q_m$ is a modulation order.

With reference to the fourth possible implementation of the second aspect, in a fifth possible implementation of the second aspect, the obtaining a resource occupied by the first UCI includes: obtaining, in the following manner, the quantity $Q_1$ of encoded bits occupied by the first UCI:

$$Q_1 = \lceil Q'^*(O_1/(O_1+O_2))^*\beta_{offset} \rceil \text{ or}$$
$$Q_1 = M_{sc}^{PUCCH} * N_{symb}^{UCI1}; \text{ and}$$

obtaining a resource occupied by the second UCI includes: obtaining, in the following manner, the quantity $Q_2$ of encoded bits occupied by the second UCI:

$$Q_2 = Q - Q_1 \text{ or } Q_2 = M_{sc}^{PUCCH} * N_{symb}^{UCI2}, \text{ where}$$

$O_1$ is a quantity of information bits of the to-be-transmitted first UCI, $O_2$ is a quantity of information bits of the to-be-transmitted second UCI, $Q$ is a capacity of the physical uplink channel, $Q=M_{sc}^{PUCCH}*N_{symb}^{PUCCH}*Q_m$, $M_{sc}^{PUCCH}$ is a quantity of subcarriers allocated to the physical uplink channel, $M_{sc}^{PUCCH}=12*N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH}=(2\cdot N_{symb}^{UL}-N_{DMRS}-N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, $N_{symb}^{UCI1}$ is a quantity of time domain symbols used to transmit the second UCI, and $Q_m$ is a modulation order.

With reference to any one of the second aspect, or the first to the fifth possible implementations of the second aspect, in a sixth possible implementation of the second aspect, the performing channel decoding on the encoded bit sequence of the first UCI according to the resource occupied by the first UCI, to obtain the first UCI, and performing channel decoding on the encoded bit sequence of the second UCI according to the resource occupied by the second UCI, to obtain the second UCI includes: obtaining an encoded bit sequence of UCI on the physical uplink channel; de-interleaving the encoded bit sequence of the UCI, to obtain an encoded vector sequence of the first UCI and an encoded vector sequence of the second UCI; and converting the encoded vector sequence of the first UCI into the encoded bit sequence of the first UCI, and converting the encoded vector sequence of the second UCI into the encoded bit sequence of the second UCI.

With reference to the sixth possible implementation of the second aspect, in a seventh possible implementation of the second aspect, the de-interleaving the encoded bit sequence of the UCI, to obtain an encoded vector sequence of the first UCI and an encoded vector sequence of the second UCI includes: sequentially reading encoded bits in columns of a matrix column by column, to obtain the encoded bit sequence of the UCI; obtaining the encoded vector sequence of the first UCI from the matrix row by row; and obtaining the encoded vector sequence of the second UCI from a location, in the matrix, other than a location from which the encoded vector sequence of the first UCI is obtained.

With reference to any one of the second aspect, or the first to the fifth possible implementations of the second aspect, in an eighth possible implementation of the second aspect, the obtaining an encoded bit sequence of first UCI and an encoded bit sequence of second UCI on the physical uplink channel includes: obtaining an encoded vector sequence, or an encoded vector sequence of the first UCI and an encoded vector sequence of the second UCI on the physical uplink channel in a time domain-first and frequency domain-last manner or in a frequency domain-first and time domain-last manner; and demodulating the encoded vector sequence, or demodulating the encoded vector sequence of the first UCI and the encoded vector sequence of the second UCI, to obtain the encoded bit sequence of the first UCI and the encoded bit sequence of the second UCI.

With reference to any one of the second aspect, or the first to the fifth possible implementations of the second aspect, in a ninth possible implementation of the second aspect, the CSI of the first report type includes at least one of the following: a type 3, a type 5, a type 6, a type 2a, or periodic CSI used for beam indication, and the CSI of the second report type includes at least one of the following: a type 2, a type 2b, a type 2c, a type 4, a type 1, or a type 1a.

With reference to any one of the second aspect, or the first to the ninth possible implementations of the second aspect, in a tenth possible implementation of the second aspect, the first UCI further includes a scheduling request (SR).

According to a third aspect, user equipment is provided. The user equipment includes a processing module, configured to: obtain a resource occupied by first uplink control information UCI, and obtain a resource occupied by second UCI. The processing module is also configured to perform channel encoding on the first UCI according to the resource occupied by the first UCI, to obtain an encoded bit sequence of the first UCI, and perform channel encoding on the second UCI according to the resource occupied by the second UCI, to obtain an encoded bit sequence of the second UCI. The first UCI includes CSI of a first report type and a hybrid automatic repeat request-acknowledgment message (HARQ-ACK), and the second UCI includes CSI of a second report type; or the first UCI includes a hybrid automatic repeat request-acknowledgment message (HARQ-ACK), and the second UCI includes CSI of a first report type and/or CSI of a second report type. The processing module is also configured to map the encoded bit sequence of the first UCI and the encoded bit sequence of the second UCI to a physical uplink channel. The user equipment also includes a sending module, configured to send the physical uplink channel.

With reference to the third aspect, in a first possible implementation of the third aspect, the resource is a quantity of modulation symbols. The processing module is configured to: obtain, according to a quantity of modulation symbols occupied by the first UCI, a quantity of encoded bits occupied by the first UCI, and obtain, according to a quantity of modulation symbols occupied by the second UCI, a quantity of encoded bits occupied by the second UCI. The processing module is configured to perform channel encoding on the first UCI according to the quantity of encoded bits occupied by the first UCI, to obtain the encoded bit sequence of the first UCI, and perform channel encoding on the second UCI according to the quantity of encoded bits occupied by the second UCI, to obtain the encoded bit sequence of the second UCI.

With reference to the first possible implementation of the third aspect, in a second possible implementation of the third aspect, the processing module is specifically configured to: determine, in one of the following manners, the quantity $Q'_1$ of modulation symbols occupied by the first UCI:

$Q'_1 = \lceil Q'*(O_1/(O_1+O_2))*\beta_{offset} \rceil$;

$Q'_1 = M_{sc}^{PUCCH}*N_{symb}^{UCI1}$; or $Q'_1 = \lceil Q'*(O_1+O_2)*\beta_{offset} \rceil$; and determine, in one of the following manners, the quantity $Q'_2$ of modulation symbols occupied by the second UCI:

$Q'_2 = Q' - Q'_1$; or $Q'_2 = M_{sc}^{PUCCH}*N_{symb}^{UCI2}$; and $O_1$ is a quantity of information bits of the to-be-transmitted first UCI, $O_2$ is a quantity of information bits of the to-be-transmitted second UCI, $Q'$ is a capacity of the physical uplink channel, $Q'=M_{sc}^{PUCCH}*N_{symb}^{PUCCH}$, $M_{sc}^{PUCCH}$ is a quantity of subcarriers allocated to the physical uplink channel, $M_{sc}^{PUCCH}=12*N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH}=(2\cdot N_{symb}^{UL}-$ $N_{DMRS}-N_{SRS}$), $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, and $N_{symb}^{UCI2}$ is a quantity of time domain symbols used to transmit the second UCI.

With reference to the second possible implementation of the third aspect, in a third possible implementation of the third aspect, the processing module is specifically configured to obtain, in the following manner, the quantity of encoded bits occupied by the first UCI:

$$Q_1 = Q'_1 * Q_m; \text{ and}$$

the processing module is configured to obtain, in the following manner, a quantity of encoded bits occupied by the second UCI:

$$Q_2 = Q'_2 * Q_m, \text{ where}$$

$Q'_1$ is the quantity of modulation symbols occupied by the first UCI, $Q'_1$ is the quantity of modulation symbols occupied by the second UCI, and $Q_m$ is a modulation order.

With reference to the third aspect, in a fourth possible implementation of the third aspect, the resource is a quantity of encoded bits. The processing module is configured to: perform channel encoding on the first UCI according to a quantity of encoded bits occupied by the first UCI, to obtain the encoded bit sequence of the first UCI, and perform channel encoding on the second UCI according to a quantity of encoded bits occupied by the second UCI, to obtain the encoded bit sequence of the second UCI.

With reference to the fourth possible implementation of the third aspect, in a fifth possible implementation of the third aspect, the processing module is specifically configured to obtain, in the following manner, the quantity $Q_1$ of encoded bits occupied by the first UCI:

$$Q_1 = \lceil Q' * (O_1/(O_1+O_2)) * \beta_{offset} \rceil \text{ or}$$
$$Q_1 = M_{sc}^{PUCCH} * N_{symb}^{UCI1}; \text{ and}$$

the processing module is configured to obtain, in the following manner, the quantity $Q_2$ of encoded bits occupied by the second UCI:

$$Q_2 = Q - Q_1 \text{ or } Q_2 = M_{sc}^{PUCCH} * N_{symb}^{UCI2}, \text{ where}$$

$O_1$ is a quantity of information bits of the to-be-transmitted first UCI, $O_2$ is a quantity of information bits of the to-be-transmitted second UCI, $Q$ is a capacity of the physical uplink channel, $Q' = M_{sc}^{PUCCH} * N_{symb}^{PUCCH}$, $M_{sc}^{PUCCH}$ is a quantity of subcarriers allocated to the physical uplink channel, $M_{sc}^{PUCCH} = 12*N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH} = (2 \cdot N_{symb}^{UL} - N_{DMRS} - N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, and $Q_m$ is a modulation order.

With reference to any one of the third aspect, or the first to the fifth possible implementations of the third aspect, in a sixth possible implementation of the third aspect, the processing module is configured to: convert the encoded bit sequence of the first UCI into an encoded vector sequence of the first UCI, and convert the encoded bit sequence of the second UCI into an encoded vector sequence of the second UCI; interleave the encoded vector sequence of the first UCI and the encoded vector sequence of the second UCI, to obtain an encoded bit sequence of UCI; and map the encoded bit sequence of the UCI to the physical uplink channel.

With reference to the sixth possible implementation of the third aspect, in a seventh possible implementation of the third aspect, the processing module is configured to: write the encoded vector sequence of the first UCI into a matrix row by row, write, row by row, the encoded vector sequence of the second UCI into a location, in the matrix, other than a location into which the encoded vector sequence of the first UCI is written; and sequentially read encoded bits in columns of the matrix column by column, to obtain the encoded bit sequence of the UCI.

With reference to any one of the third aspect, or the first to the fifth possible implementations of the third aspect, in an eighth possible implementation of the third aspect, the processing module is configured to: modulate the encoded bit sequence of the first UCI and the encoded bit sequence of the second UCI, to obtain an encoded vector sequence, or modulate the encoded bit sequence of the first UCI and the encoded bit sequence of the second UCI, to obtain an encoded vector sequence of the first UCI and an encoded vector sequence of the second UCI respectively; and map the encoded vector sequence, or the encoded vector sequence of the first UCI and the encoded vector sequence of the second UCI to the physical uplink channel in a frequency domain-first and time domain-last manner or in a time domain-first and frequency domain-last manner.

With reference to any one of the third aspect, or the first to the eighth possible implementations of the third aspect, in a ninth possible implementation of the third aspect, the CSI that is of the first report type and that is obtained by the processing module includes at least one of the following: a type 3, a type 5, a type 6, a type 2a, or periodic CSI used for beam indication, and the CSI of the second report type includes at least one of the following: a type 2, a type 2b, a type 2c, a type 4, a type 1, or a type 1a.

With reference to any one of the third aspect, or the first to the ninth possible implementations of the third aspect, in a tenth possible implementation of the third aspect, the first UCI obtained by the processing module further includes a scheduling request (SR).

According to a fourth aspect, a network device is provided. The network device includes a receiving module, configured to receive a physical uplink channel. The network device also includes a processing module, configured to: obtain an encoded bit sequence of first UCI and an encoded bit sequence of second UCI on the physical uplink channel. The processing module is also configured to obtain a resource occupied by the first uplink control information UCI, and obtain a resource occupied by the second UCI. The processing module is also configured to perform channel decoding on the encoded bit sequence of the first UCI according to the resource occupied by the first UCI, to obtain the first UCI, and perform channel decoding on the encoded bit sequence of the second UCI according to the resource occupied by the second UCI, to obtain the second UCI. The first UCI includes CSI of a first report type and a hybrid automatic repeat request-acknowledgment message (HARQ-ACK), and the second UCI includes CSI of a second report type; or the first UCI includes a hybrid automatic repeat request-acknowledgment message (HARQ-ACK), and the second UCI includes CSI of a first report type and/or CSI of a second report type.

With reference to the fourth aspect, in a first possible implementation of the fourth aspect, the resource is a quantity of modulation symbols. The processing module is configured to: obtain, according to the resource occupied by the first UCI, modulation symbols corresponding to the first UCI on the physical uplink channel, and obtain, according to the resource occupied by the second UCI, modulation symbols corresponding to the second UCI on the physical uplink channel; and perform channel decoding on the first UCI according to the modulation symbols corresponding to the first UCI, to obtain the first UCI transmitted by UE, and perform channel decoding on the second UCI according to the modulation symbols corresponding to the second UCI, to obtain the second UCI transmitted by the UE.

With reference to the first possible implementation of the fourth aspect, in a second possible implementation of the fourth aspect, the processing module is configured to: determine, in one of the following manners, a quantity $Q'_1$ of modulation symbols occupied by the first UCI:

$Q'_1 = \lceil Q'*(O_1/(O_1+O_2))*\beta_{offset} \rceil$;

$Q'_1 = M_{sc}^{PUCCH}*N_{symb}^{UCI1}$; or $Q'_1 = \lceil Q'*(O_1+O_2)*\beta_{offset} \rceil$; and obtaining a resource occupied by second UCI includes:
determine, in one of the following manners, a quantity $Q_2$ of modulation symbols occupied by the second UCI:

$Q'_2 = Q' - Q'_1$; or $Q'_2 = M_{sc}^{PUCCH}*N_{symb}^{UCI2}$; and $O_1$ is a quantity of information bits of the to-be-transmitted first UCI, $O_2$ is a quantity of information bits of the to-be-transmitted second UCI, $Q'$ is a capacity of the physical uplink channel, $Q' = M_{sc}^{PUCCH}*N_{symb}^{PUCCH}$, $M_{sc}^{PUCCH}$ is a quantity of subcarriers allocated to the physical uplink channel, $M_{sc}^{PUCCH}=12*N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH}=(2 \cdot N_{symb}^{UL} - N_{DMRS}-N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, and $N_{symb}^{UCI2}$ is a quantity of time domain symbols used to transmit the second UCI.

With reference to the second possible implementation of the fourth aspect, in a third possible implementation of the fourth aspect, the processing module is configured to: obtain, in the following manner, a quantity of encoded bits occupied by the first UCI:

$Q_1 = Q'_1 * Q_m$; and obtain, in the following manner, a quantity of encoded bits occupied by the second UCI:

$Q_2 = Q'_2 * Q_m$, where $Q'_1$ is the quantity of modulation symbols occupied by the first UCI, $Q'_2$ is the quantity of modulation symbols occupied by the second UCI, and $Q_m$ is a modulation order.

With reference to the fourth aspect, in a fourth possible implementation of the fourth aspect, the resource is a quantity of encoded bits. The processing module is configured to: perform channel decoding on the first UCI according to a quantity of encoded bits occupied by the first UCI, to obtain the encoded bit sequence of the first UCI, and perform channel decoding on the second UCI according to a quantity of encoded bits occupied by the second UCI, to obtain the encoded bit sequence of the second UCI.

With reference to the fourth possible implementation of the fourth aspect, in a fifth possible implementation of the fourth aspect, the processing module is configured to: obtain, in the following manner, the quantity $Q_1$ of encoded bits occupied by the first UCI:

$Q_1 = \lceil Q'*(O_1/(O_1+O_2))*\beta_{offset} \rceil$ or
$Q_1 = M_{sc}^{PUCCH}*N_{symb}^{UCI1}$; and obtain, in the following manner, the quantity $Q_2$ of encoded bits occupied by the second UCI:

$Q_2 = Q - Q_1$ or $Q_2 = M_{sc}^{PUCCH}*N_{symb}^{UCI2}$, where $O_1$ is a quantity of information bits of the to-be-transmitted first UCI, $O_2$ is a quantity of information bits of the to-be-transmitted second UCI, $Q$ is a capacity of the physical uplink channel, $Q = M_{sc}^{PUCCH}*N_{symb}^{PUCCH}*Q_m$, $M_{sc}^{PUCCH}$ is a quantity of subcarriers allocated to the physical uplink channel, $M_{sc}^{PUCCH}=12*N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH}=(2 \cdot N_{symb}^{UL} - N_{DMRS}-N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, and $Q_m$ is a modulation order.

With reference to any one of the fourth aspect, or the first to the fifth possible implementations of the fourth aspect, in a sixth possible implementation of the fourth aspect, the processing module is configured to: obtain an encoded bit sequence of UCI on the physical uplink channel; de-interleave the encoded bit sequence of the UCI, to obtain an encoded vector sequence of the first UCI and an encoded vector sequence of the second UCI; and convert the encoded vector sequence of the first UCI into the encoded bit sequence of the first UCI, and convert the encoded vector sequence of the second UCI into the encoded bit sequence of the second UCI.

With reference to the sixth possible implementation of the fourth aspect, in a seventh possible implementation of the fourth aspect, the processing module is specifically configured to: sequentially read encoded bits in columns of a matrix column by column, to obtain the encoded bit sequence of the UCI; obtain the encoded vector sequence of the first UCI from the matrix row by row; and obtain the encoded vector sequence of the second UCI from a location, in the matrix, other than a location from which the encoded vector sequence of the first UCI is obtained.

With reference to any one of the fourth aspect, or the first to the fifth possible implementations of the fourth aspect, in an eighth possible implementation of the fourth aspect, the processing module is specifically configured to: obtain an encoded vector sequence, or an encoded vector sequence of the first UCI and an encoded vector sequence of the second UCI on the physical uplink channel in a time domain-first and frequency domain-last manner or in a frequency domain-first and time domain-last manner; and demodulate the encoded vector sequence, or demodulate the encoded vector sequence of the first UCI and the encoded vector sequence of the second UCI, to obtain the encoded bit sequence of the first UCI and the encoded bit sequence of the second UCI.

With reference to any one of the fourth aspect, or the first to the eighth possible implementations of the fourth aspect, in a ninth possible implementation of the fourth aspect, the CSI that is of the first report type and that is obtained by the processing module includes at least one of the following: a type 3, a type 5, a type 6, a type 2a, or periodic CSI used for beam indication, and the CSI of the second report type includes at least one of the following: a type 2, a type 2b, a type 2c, a type 4, a type 1, or a type 1a.

With reference to any one of the fourth aspect, or the first to the ninth possible implementations of the fourth aspect, in a tenth possible implementation of the fourth aspect, the first UCI obtained by the processing module further includes a scheduling request SR.

In the foregoing technical solutions, the first UCI and the second UCI are independently encoded, and corresponding resources may be allocated to the first UCI and the second UCI according to performance target requirements of different UCI, so that different UCI meets respective performance target requirements, and transmit power is not increased according to UCI with a highest performance requirement, thereby improving power utilization.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

UE uses higher transmit power to send UCI, but for UCI with a relatively low performance target requirement, the transmit power is excessively high, and consequently, transmit power of the UE is wasted, and power utilization is not high. This solution is not applicable to user equipment with limited power. In addition, if UE has limited power, transmit power cannot be increased. Therefore, UCI with a relatively high performance target requirement cannot meet a performance requirement by increasing transmit power. In technical solutions provided in embodiments of the present invention, first UCI and second UCI are independently encoded, and corresponding resources may be allocated to the first UCI and the second UCI according to performance target requirements of different UCI. In this manner, different UCI meets respective performance target requirements, and transmit power is not increased according to UCI with a highest performance requirement, thereby improving power utilization.

Main implementation principles and specific implementations of the technical solutions in the embodiments of the present invention, and corresponding advantageous effects are described in detail below with reference to the accompanying drawings.

The technical solutions of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, and a Long Term Evolution (LTE) system.

User equipment (UE) may also be referred to as a mobile terminal, mobile user equipment, and the like. The user equipment may communicate with one or more core networks by using a radio access network (RAN). The user equipment may be a mobile terminal such as a mobile phone (or referred to as a "cellular" phone), or a computer having a mobile terminal. For example, the user equipment may be a portable, pocket-sized, handheld, computer built-in, or in-vehicle mobile apparatus, which exchanges voice and/or data with the radio access network.

A base station may be a base transceiver station (BTS) in GSM or CDMA, may be a NodeB in WCDMA, or may be an evolved NodeB (evolutional Node B, eNB or e-NodeB) in LTE, and this is not limited in the present invention.

Embodiment 1

Figure 1:
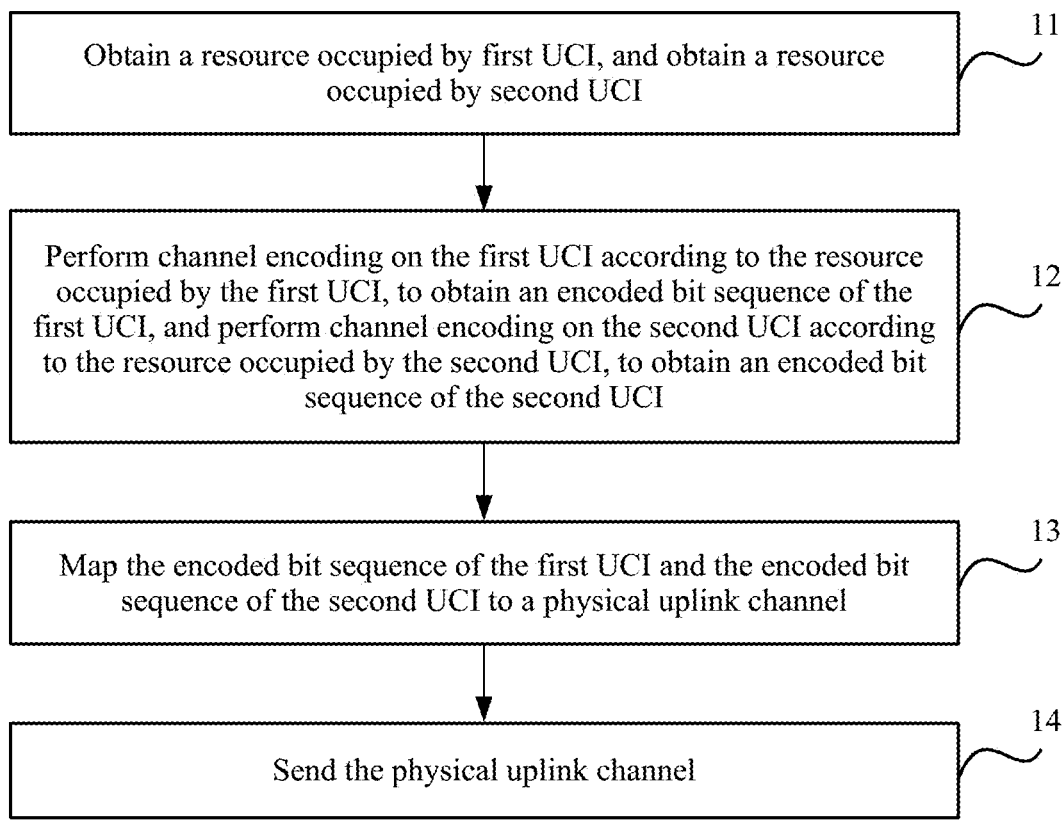
FIG. 1 is a flowchart of a control information sending method according to Embodiment 1 of the present invention.

Embodiment 1 of the present invention provides a control information sending method. As shown in FIG. 1, a processing procedure of the method is as follows.

Step 11: Obtain a resource occupied by first UCI, and obtain a resource occupied by second UCI.

The first UCI is channel state information (CSI) of a first report type and a hybrid automatic repeat request-acknowledgment message (HARQ-ACK); or the first UCI is CSI of a first report type, a HARQ-ACK, and a scheduling request (SR). The second UCI is CSI of a second report type.

Alternatively, the first UCI includes a HARQ-ACK, the second UCI includes CSI, and the CSI may be CSI of a first report type or CSI of a second report type.

The CSI has the following types:

a first type: type 1 (Type 1), which supports a subband channel quality indicator (CQI) feedback selected by UE;

a second type: type 1a (Type 1a), which supports a subband CQI feedback and a precoding matrix indicator (Precoding Matrix Indicator, PMI) feedback;

a third type: type 2a (Type 2a), which supports a wideband PMI feedback;

a fourth type: type 3 (Type 3), which supports a rank indication (RI) feedback; a fifth type: type 4 (Type 4), which supports a wideband CQI feedback;

a sixth type: type 5 (Type 5), which supports an RI feedback and a wideband PMI feedback;

a seventh type: type 6 (Type 6), which supports an RI feedback and a PTI feedback; and an eighth type: periodic CSI used for beam indication.

In LTE R13, a report type of periodic CSI is introduced, report content is a beam index, and the report type may be referred to as a type of periodic CSI corresponding to beam indication.

Performance requirements imposed by a system on some report types are higher than a performance requirement of another report type. For example, a performance target requirement of the report type type 3 is a block error rate BLER=10e-3, and a performance target requirement of the type 4 is a block error rate BLER=10e-2. In addition, in an LTE system, a performance target requirement of hybrid automatic repeat request-acknowledgment information is usually higher than that of a periodic CQI/PMI, for example, is at least a block error rate BLER=10e-3.

Based on different performance requirements imposed by the system on some report types, in a technical solution provided in Embodiment 1 of the present invention, different types of periodic CSI of a plurality of carriers are classified into two types: CSI of the first report type and CSI of the second report type. The CSI of the first report type includes at least one of the type 3, the type 5, the type 6, the type 2a, or the periodic CSI corresponding to beam indication, and the CSI of the second report type includes at least one of the type 2, the type 2b, the type 2c, the type 4, the type 1, or the type 1a.

The first UCI includes the CSI of the first report type and the HARQ-ACK, or the first UCI includes the CSI of the first report type, the HARQ-ACK, and the SR. The second UCI includes the CSI of the second report type.

Alternatively, the first UCI includes the HARQ-ACK, the second UCI includes the CSI, and the CSI may be CSI of the first report type or CSI of the second report type.

In an implementation, in the technical solution provided in Embodiment 1 of the present invention, a performance requirement of a report type of the first UCI is higher than that of a report type of the second UCI. The report type of the first UCI may include at least one of the type 3, the type 5, the type 6, the type 2a, or the periodic CSI corresponding to beam indication, and the report type of the second UCI may include at least one of the type 2, the type 2b, the type 2c, the type 4, the type 1, or the type 1a.

In this step, the resource occupied by the first UCI is obtained. The resource occupied by the first UCI may be a quantity of modulation symbols or a quantity of encoded bits. Correspondingly, the resource occupied by the second UCI may be a quantity of modulation symbols or a quantity of encoded bits. Detailed descriptions are separately provided below.

If the resources occupied by the first UCI and the second UCI are quantities of modulation symbols, the resources occupied by the first UCI and the second UCI may be obtained in the following manners.

Manner 1: Determine, according to Formula 1, a quantity $Q'_1$ of modulation symbols occupied by the first UCI:

$$Q'_1 = \lceil Q'*(O_1/(O_1+O_2))*\beta_{offset} \rceil \quad \text{Formula 1, where}$$

$O_1$ is a quantity of information bits of the to-be-transmitted first UCI, $O_2$ is a quantity of information bits of the to-be-transmitted second UCI, and $\beta_{offset}$ is a value semi-statically configured by using higher layer signaling or a predetermined value; and determine, according to Formula 2, a quantity $Q'_2$ of modulation symbols occupied by the second UCI:

$$Q'_2 = Q' - Q'_1 \quad \text{Formula 2}$$

In Formula 1 and Formula 2, $Q'$ is a capacity of the physical uplink channel, and may be determined according to Formula 3:

$$Q'_2 = M_{sc}^{PUCCH} * N_{symb}^{PUCCH} \quad \text{Formula 3, where}$$

$M_{sc}^{PUCCH}$ is a quantity of subcarriers allocated to the physical uplink channel, and may be determined according to Formula 4, and $N_{symb}^{PUCCH}$ is a quantity of time domain symbols used to transmit uplink control information on the physical uplink channel, and may be determined according to Formula 5:

$$M_{sc}^{PUCCH} = 12 * N_{PRB} \quad \text{Formula 4; and}$$

$$N_{symb}^{PUCCH} = (2 \cdot N_{symb}^{UL} - N_{DMRS} - N_{SRS}) \quad \text{Formula 5, where}$$

$N_{symb}^{UL}$ is a quantity of time domain symbols occupied by the physical uplink channel in one timeslot, and $N_{DMRS}$ is a quantity of symbols used to transmit a DMRS pilot signal on the physical uplink channel in one subframe.

In Formula 1 to Formula 5, $O_1$ is the quantity of information bits of the to-be-transmitted first UCI, and $O_2$ is the quantity of information bits of the to-be-transmitted second UCI. When cyclic redundancy checks (CRCs) need to be attached to the first UCI and the second UCI, corresponding $O_1$ is an information length that is of the first UCI and that includes a length of a CRC, and corresponding $O_2$ is an information length that is of the second UCI and that includes a length of a CRC. For example, when uplink control information (a HARQ-ACK, CSI, and the like) is greater than 22 bits and is less than or equal to 119, a CRC is attached, and a length of the CRC is 8 bits; or when uplink control information is greater than 119, a CRC of 16 bits is attached. $O_1$ and $O_2$ herein each are a sum of a quantity of bits of the uplink control information and a quantity of bits of the CRC. When $O_2=0$, $\beta_{offset}=1$.

$N_{symb}^{UL}$ is the quantity of time domain symbols occupied by the physical uplink channel in one timeslot. In a normal cyclic prefix (CP) case, a value of $N_{symb}^{UL}$ is 7, or in an extended CP case, a value of N is 6. $N_{DMRS}$ is the quantity of symbols used to transmit a DMRS pilot signal on the physical channel in one subframe. When the physical uplink control channel is of a structure shown in FIG. 2, a value of $N_{DMRS}$ is 1, a value of $N_{SRS}$ is a quantity of time domain symbols used to transmit an SRS in the subframe. When an SRS is transmitted in a current subframe, a value of $N_{SRS}$ is 1, or when no SRS is transmitted in a current subframe, a value of $N^{SRS}$ is 0. For example, when the physical uplink channel is of a PUCCH format 3, a spread factor needs to be considered. $V_{SF}$ is a value of the spread factor (SF). Therefore, $Q' = M_{sc}^{PUCCH} * N_{symb}^{PUCCH}/V_{SF}$, a value of $V_{SF}$ is 5, and a value of $N_{DMRS}$ is 4. When the physical uplink channel is of a channel structure shown in FIG. 3, a value of $V_{SF}$ is 3, and a value of $N_{DMRS}$ is 2.

Manner 2: Determine, according to Formula 6, a quantity $Q'_1$ of modulation symbols occupied by the first UCI:

$$Q_1 = \lceil Q'*(O_1/(O_1+O_2))*\beta_{offset} \rceil \quad \text{Formula 6; and}$$

determine, according to Formula 2, a quantity $Q'_2$ of modulation symbols occupied by the second UCI:

$$Q'_2 = Q' - Q'_1$$

For meanings of parameters in Formula 6, refer to the detailed descriptions in Formula 1 to Formula 5.

Manner 3: Determine, according to Formula 7, a quantity $Q'_1$ of modulation symbols occupied by the first UCI:

$$Q'_1 = M_{sc}^{PUCCH} * N_{symb}^{UCI1} \quad \text{Formula 7; and}$$

determine, according to Formula 8 or Formula 2, a quantity $Q'_2$ of modulation symbols occupied by the second UCI:

$$Q'_2 = M_{sc}^{PUCCH} * N_{symb}^{UCI2} \quad \text{Formula 8; or}$$

$$Q'_2 = Q' - Q'_1, \text{ where}$$

$N_{symb}^{UCI1}$ is a quantity of time domain symbols used to transmit the first UCI, and the value may be a value semi-statically notified by using higher layer signaling or may be a predetermined value, for example, the value is 4. A meaning of a value of $M_{sc}^{PUCCH}$ is consistent with that in Manner 2, and details are not described herein again. A value of $Q'$ is consistent with a parameter in Manner 1, and details are not described herein again.

$$Q'_2 = M_{sc}^{PUCCH} * N_{symb}^{UCI2} \quad \text{Formula 8; or}$$

$$Q'_2 = Q' - Q'_1, \text{ where}$$

$N_{symb}^{UCI1}$ is a quantity of time domain symbols used to transmit the first UCI, and may be a value semi-statically notified by using higher layer signaling or may be a predetermined value, for example, the value is 4. A value of $M_{sc}^{PUCHH}$ is consistent with that in Manner 2, and details are not described herein again. $Q'$ is consistent with that in Manner 1, and details are not described herein again. $N_{symb}^{UCI1}$ is the quantity of time domain symbols used to transmit the first UCI, and $N_{symb}^{UCI2}$ is a quantity of time domain symbols used to transmit the second UCI.

A quantity of encoded bits occupied by the first UCI is calculated according to the quantity of modulation symbols occupied by the first UCI, and a quantity of encoded bits occupied by the second UCI is calculated according to the quantity of modulation symbols occupied by the second UCI, including: calculating, according to a quantity of modulation symbols occupied by CSI of the first report type, the quantity of encoded bits occupied by the first UCI, and calculating, according to a quantity of modulation symbols occupied by CSI of the second report type, the quantity of encoded bits occupied by the second UCI.

If the resources occupied by the first UCI and the second UCI are quantities of encoded bits, the resources occupied by the first UCI and the second UCI may be obtained in the following manners.

Manner 1: Determine, according to Formula 9, a quantity $Q_1$ of encoded bits occupied by the first UCI:

$$Q_1 = \lceil Q'^* (O_1/(O_1+O_2))^* \beta_{offset} \rceil \quad \text{Formula 9; and}$$

determine, according to Formula 10, a quantity $Q_2$ of encoded bits occupied by the second UCI:

$$Q_2 = Q - Q_1 \quad \text{Formula 10}$$

Manner 2: Determine, according to Formula 11, a quantity $Q_1$ of encoded bits occupied by the first UCI:

$$Q_1 = M_{sc}^{PUCCH} * N_{symb}^{UCI1} \quad \text{Formula 11; and}$$

determine, according to Formula 12, a quantity $Q_2$ of encoded bits occupied by the second UCI:

$$Q_2 = M_{sc}^{PUCCH} * N_{symb}^{UCI2} \quad \text{Formula 12}$$

In Formula 9 to Formula 12, meanings of parameters are: $O_1$ is a quantity of information bits of the to-be-transmitted first UCI, and $O_2$ is a quantity of information bits of the to-be-transmitted second UCI. $Q$ is a capacity of the physical uplink channel, and may be determined according to Formula 13:

$$Q = M_{sc}^{PUCCH} * N_{symb}^{PUCCH} * Q_m \quad \text{Formula 13, where}$$

$M_{sc}^{PUCCH}$ is a quantity of subcarriers allocated to the physical uplink channel, $M_{sc}^{PUCCH} = 12 * N_{PRB}$, $N_{PRB}$ is a quantity of RBs allocated to the physical uplink channel, and $N_{symb}^{PUCCH}$ is a quantity of time domain symbols used to transmit uplink control information on the physical uplink channel, and may be determined according to Formula 14:

$$N_{symb}^{PUCCH} = (2 \cdot N_{symb}^{UL} - N_{DMRS} - N_{SRS}) \quad \text{Formula 14, where}$$

$N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, and $Q_m$ is a modulation order.

Manner 2: Determine, according to Formula 15, a quantity $Q_1$ of encoded bits occupied by the first UCI:

$$Q_1 = Q'_1 * Q_m \quad \text{Formula 15; and}$$

determine, according to Formula 16, a quantity $Q_2$ of encoded bits occupied by the second UCI:

$$Q_2 = Q'_2 * Q_m \quad \text{Formula 16}$$

In Formula 15 and Formula 16, $Q'_1$ is a quantity of modulation symbols occupied by the first UCI, $Q'_2$ is a quantity of modulation symbols occupied by the second UCI, and $Q_m$ is a modulation order.

Step 12: Perform channel encoding on the first UCI according to the resource occupied by the first UCI, to obtain an encoded bit sequence of the first UCI, and perform channel encoding on the second UCI according to the resource occupied by the second UCI, to obtain an encoded bit sequence of the second UCI.

The step of performing channel encoding on the first UCI according to the resource occupied by the first UCI, to obtain an encoded bit sequence of the first UCI, and performing channel encoding on the second UCI according to the resource occupied by the second UCI, to obtain an encoded bit sequence of the second UCI may be performed in the following two manners according to different resources.

Manner 1: When the resource is a quantity of modulation symbols, calculate, according to the quantity of modulation symbols occupied by the first UCI, the quantity of encoded bits occupied by the first UCI, and calculate, according to the quantity of modulation symbols occupied by the second UCI, the quantity of encoded bits occupied by the second UCI; and perform channel encoding on the first UCI according to the quantity of encoded bits occupied by the first UCI, to obtain the encoded bit sequence of the first UCI, and perform channel encoding on the second UCI according to the quantity of encoded bits occupied by the second UCI, to obtain the encoded bit sequence of the second UCI.

If the resource is a quantity of modulation symbols, before channel encoding is separately performed on the first UCI and the second UCI, the quantity of encoded bits of the first UCI and the quantity of encoded bits of the second UCI are first calculated according to the obtained quantity of modulation symbols occupied by the first UCI and the obtained quantity of modulation symbols occupied by the second UCI. For details, refer to the detailed descriptions in Formula 15 and Formula 16.

In addition, channel encoding is performed according to the quantity of encoded bits of the first UCI and the quantity of encoded bits of the second UCI, to obtain the encoded bit sequence $q_0^1, q_1^1, q_2^1 \ldots q_{Q_1-1}^1$ of the first UCI and the encoded bit sequence $q_0^2, q_1^2, q_2^2 \ldots q_{Q2-1}^2$ of the second UCI.

Manner 2: When the resource is a quantity of encoded bits, perform channel encoding on the first UCI according to the quantity of encoded bits occupied by the first UCI, to obtain the encoded bit sequence of the first UCI, and perform channel encoding on the second UCI according to the quantity of encoded bits occupied by the second UCI, to obtain the encoded bit sequence of the second UCI.

If the resource is a quantity of encoded bits, channel encoding is separately performed on the first UCI and the second UCI according to the obtained quantity of encoded bits of the first UCI and the obtained quantity of encoded bits of the second UCI, to obtain the encoded bit sequence $q_0^1$, $q_1^1, q_2^1 \ldots q_{Q_1-1}^1$ of the first UCI and the encoded bit sequence $q_0^2, q_1^2, q_2^2 \ldots q_{Q2-1}^2$ of the second UCI.

The following is a specific implementation of step 12 of performing channel encoding on the first UCI according to the resource occupied by the first UCI, to obtain the encoded bit sequence of the first UCI, and performing channel encoding on the second UCI according to the resource occupied by the second UCI, to obtain the encoded bit sequence of the second UCI.

When the total quantity of information bits of the to-be-transmitted first UCI or the total quantity of information bits of the to-be-transmitted second UCI is less than or equal to 11, encoding is performed using a Reed-Muller (RM)(32, O) code. When the total quantity of information bits of the to-be-transmitted first UCI or the total quantity of information bits of the to-be-transmitted second UCI is greater than 11 and is less than or equal to 22, encoding is performed using a dual Reed-Muller RM(32, O) code. When the total quantity of information bits of the to-be-transmitted first UCI or the total quantity of information bits of the to-be-transmitted second UCI is greater than 22, channel encoding is performed using a tail biting convolutional code (TBCC) or a Turbo code, and a CRC is attached.

For ease of description, in the technical solution provided in Embodiment 1 of the present invention, in step 11 and step 12, detailed descriptions are provided according to an execution order of the following: obtaining the resource occupied by the first uplink control information (UCI), and obtaining the resource occupied by the second UCI; and performing channel encoding on the first UCI according to the resource occupied by the first UCI, to obtain the encoded bit sequence of the first UCI, and performing channel encoding on the second UCI according to the resource occupied by the second UCI, to obtain the encoded bit sequence of the second UCI. In a specific implementation process, an execution order may be: obtaining the resource occupied by the first uplink control information UCI, and performing channel encoding on the first UCI according to the resource occupied by the first UCI, to obtain the encoded bit sequence of the first UCI; and obtaining the resource occupied by the second UCI, and performing channel encoding on the second UCI according to the resource occupied by the second UCI, to obtain the encoded bit sequence of the second UCI; or an execution order may be: obtaining the resource occupied by the second uplink control information UCI, and performing channel encoding on the second UCI according to the resource occupied by the second UCI, to obtain the encoded bit sequence of the second UCI; and obtaining the resource occupied by the first UCI, and performing channel encoding on the first UCI according to the resource occupied by the first UCI, to obtain the encoded bit sequence of the first UCI. For a specific implementation, refer to the detailed descriptions above, and details are not described herein again.

Step 13: Map the encoded bit sequence of the first UCI and the encoded bit sequence of the second UCI to a physical uplink channel.

In step 13, the encoded bit sequence of the first UCI and the encoded bit sequence of the second UCI may be mapped to the physical uplink channel in the following manners.

Manner 1: In a first processing manner, a specific procedure is as follows.

Step 1: Convert the encoded bit sequence of the first UCI into an encoded vector sequence of the first UCI, and convert the encoded bit sequence of the second UCI into an encoded vector sequence of the second UCI.

The encoded bit sequence of the first UCI and the bit sequence of the second UCI are converted into the encoded vector sequence $\underline{q_0^1}, \underline{q_1^1}, \underline{q_2^1} \ldots \underline{q_{Q_1'-1}^1}$ of the first UCI and the encoded vector sequence $\underline{q_0^2}, \underline{q_1^2}, \underline{q_2^2} \ldots \underline{q_{Q2'-1}^2}$ of the second UCI respectively, where $Q'_1 = Q_1/Q_m$ and $Q'_2 = Q_2/Q_m$ Step 1 may be implemented using a modulation scheme such as QPSK, 16QAM, 64QAM, or 256QAK, so that the corresponding encoded vector sequence $\underline{q_0^1}, \underline{q_1^1}, \underline{q_2^1} \ldots \underline{q_{Q_1'-1}^1}$ of the first UCI and the corresponding encoded vector sequence $\underline{q_0^2}, \underline{q_1^2}, \underline{q_2^2} \ldots \underline{q_{Q2'-1}^2}$ of the second UCI are obtained.

Step 2: Perform channel interleaving on the encoded vector sequence of the first UCI and the encoded vector sequence of the second UCI, to obtain an encoded bit sequence of UCI.

The encoded vector sequence of the first UCI is written into a matrix row by row, the encoded vector sequence of the second UCI is written, row by row, into a location, in the matrix, other than a location into which the encoded vector sequence of the first UCI is written, and encoded bits in columns of the matrix are sequentially read column by column, to obtain the encoded bit sequence of the UCI.

When interleaving is performed in the foregoing manner, the first UCI and the second UCI may be not limited to the following cases.

In a first case, the first UCI includes the CSI of the first report type and the HARQ-ACK, and the second UCI is the CSI of the second report type. In a second case, the first UCI may include only the HARQ-ACK, the second UCI may include only the CSI, and the CSI may be the CSI of the first report type or the CSI of the second report type.

Channel interleaving is performed on the encoded vector sequence $\underline{q_0^1}, \underline{q_1^1}, \underline{q_2^1} \ldots \underline{q_{Q_1'-1}^1}$ of the first uplink control information and the encoded vector sequence $\underline{q_0^2}, \underline{q_1^2}$, q22 $\ldots \underline{q_{Q2'-1}^2}$ of the second uplink control information.

The encoded vector sequence $\underline{q_0^1}, \underline{q_1^1}, \underline{q_2^1} \ldots \underline{q_{Q_1'-1}^1}$ of the first UCI and the encoded vector sequence $\underline{q_0^2}, \underline{q_1^2}, \underline{q_2^2} \ldots \underline{q_{Q2'-1}^2}$ of the second UCI are concatenated, that is, the encoded vector sequence $\underline{q_0^1}, \underline{q_1^1}, \underline{q_2^1} \ldots \underline{q_{Q_1'-1}^1}$ of the first UCI and the encoded vector sequence $\underline{q_0^2}, \underline{q_1^2}, \underline{q_2^2} \ldots \underline{q_{Q2'-1}^2}$ of the second UCI are written into the following matrix:

$$\begin{bmatrix} \underline{y}_0 & \underline{y}_1 & \underline{y}_2 & \cdots & \underline{y}_{C_{mux}-1} \\ \underline{y}_{C_{mux}} & \underline{y}_{C_{mux}+1} & \underline{y}_{C_{mux}+2} & \cdots & \underline{y}_{2C_{mux}-1} \\ \vdots & \vdots & \vdots & \ddots & \vdots \\ \underline{y}_{(R'_{mux}-1) \times C_{mux}} & \underline{y}_{(R'_{mux}-1) \times C_{mux}+1} & \underline{y}_{(R'_{mux}-1) \times C_{mux}+2} & \cdots & \underline{y}_{(R'_{mux} \times C_{mux}-1)} \end{bmatrix}$$

If the physical uplink channel is of the PUCCH format 3, $C_{max}=2$ in the matrix. If the physical uplink channel is of the modified PUCCH format 3 shown in FIG. 3, $C_{max}=4$ in the matrix. If the physical uplink channel is of a PUCCH format 4 or 5 shown in FIG. 2, $C_{max}=N_{symb}^{PUCCH}$ in the matrix. $N_{symb}^{PUCCH}$ is the quantity of time domain symbols used to transmit uplink control information on the physical uplink channel, $R'_{max}=M_{sc}^{PUCCH}$ in the matrix, and $M_{sc}^{PUCCH}$ is the quantity of subcarriers allocated to the physical uplink channel. For example, $R'_{max}=M_{SC}^{PUCCH}=12$.

The encoded information bits in the columns of the matrix are sequentially read, to obtain the encoded bit sequence $h_0$, $h_1$, $h_2$, ..., $h_{Q1+Q2-1}$ of the UCI.

Sequentially reading the encoded bits in the columns of the matrix is reading the encoded bits column by column, that is, first reading a first column, and then reading a second column after the first column is read.

Step 3: Map the encoded bit sequence that is of the UCI and that is obtained after channel interleaving to the physical uplink channel.

The encoded bit sequence of the first UCI and the encoded bit sequence of the second UCI are modulated, to obtain an encoded vector sequence, or the encoded bit sequence of the first UCI and the encoded bit sequence of the second UCI are modulated, to obtain an encoded vector sequence of the first UCI and an encoded vector sequence of the second UCI respectively; and the encoded vector sequence, or the encoded vector sequence of the first UCI and the encoded vector sequence of the second UCI are mapped to the physical uplink channel in a frequency domain-first and time domain-last manner or in a time domain-first and frequency domain-last manner.

Figure 2:
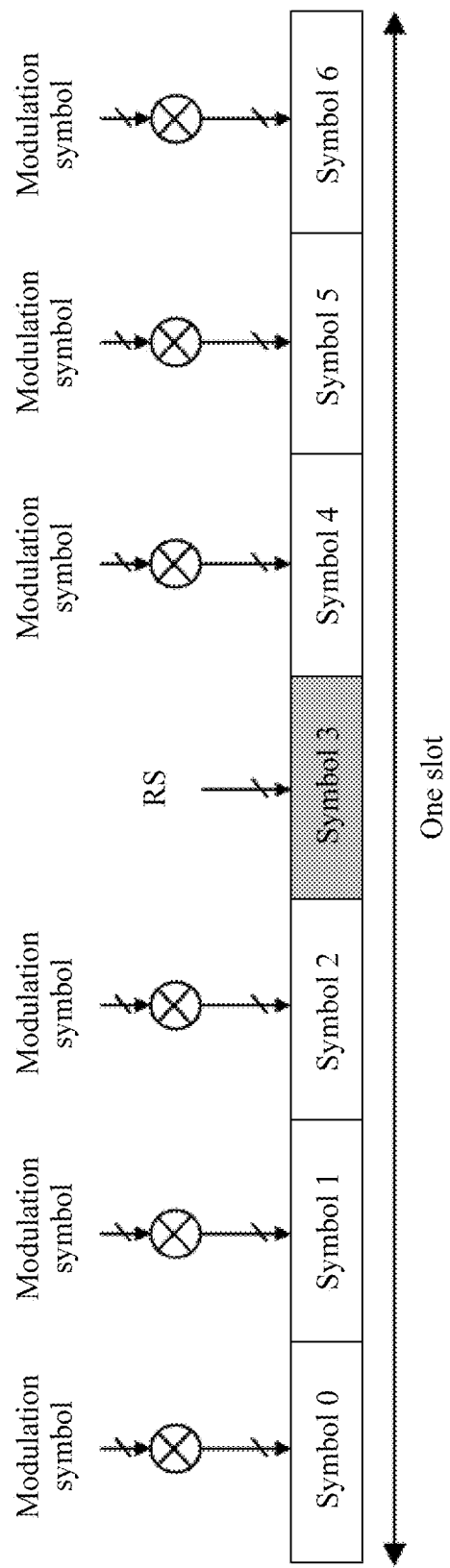
FIG. 2 is a schematic structural diagram of a physical uplink control channel format 4 or 5 in accordance with embodiments of the present invention.
Figure 3:
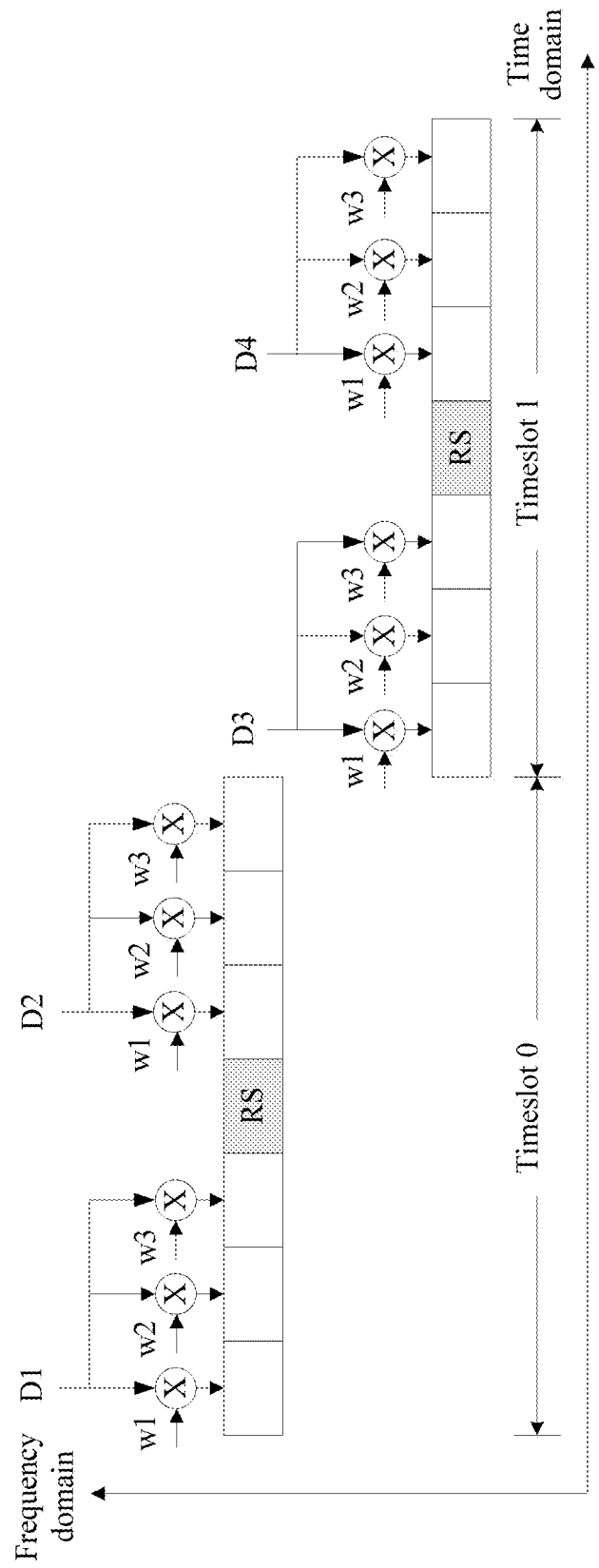
FIG. 3 is a schematic structural diagram of a modified PUCCH format 3 in accordance with embodiments of the present invention.
Figure 4:
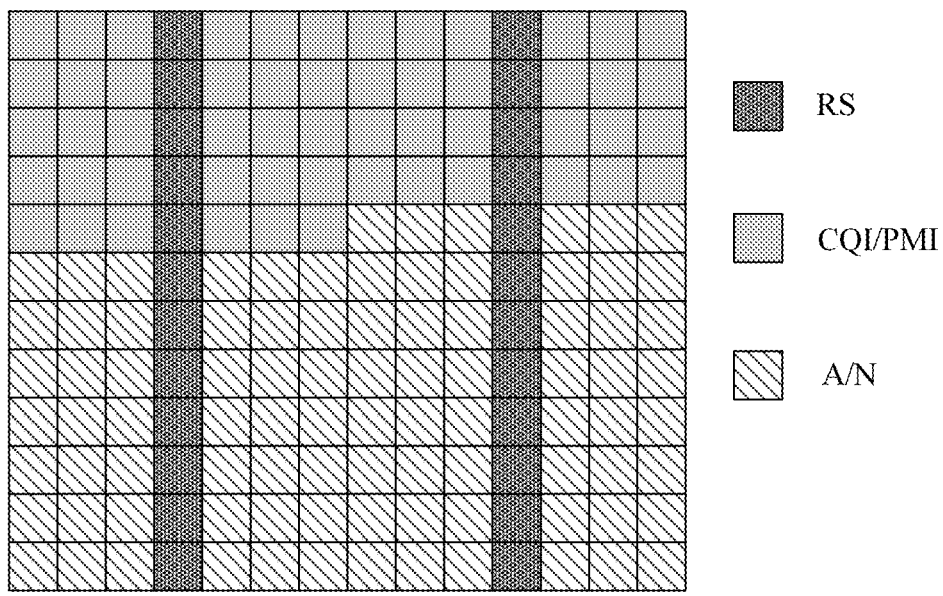
FIG. 4 is a schematic diagram of mapping first UCI and second UCI to a PUCCH in accordance with embodiments of the present invention.

When the physical uplink channel is of the PUCCH format shown in FIG. 2, after this step, a schematic diagram of mapping resources of the first uplink control information and the second uplink control information is shown in FIG. 4.

Manner 2: Concatenate the encoded bit sequence of the first UCI and the encoded bit sequence of the second UCI, to obtain a concatenated encoded bit sequence; modulate the concatenated encoded bit sequence, to obtain an encoded vector sequence; and map the encoded vector sequence to the physical uplink channel in a frequency domain-first and time domain-last manner or in a time domain-first and frequency domain-last manner, so that the encoded vector sequence can be transmitted to a base station.

Manner 3: Modulate the encoded bit sequence of the first UCI and the encoded bit sequence of the second UCI, to obtain an encoded vector sequence of the first UCI and an encoded vector sequence of the second UCI respectively; and concatenate the encoded vector sequence of the first UCI and the encoded vector sequence of the second UCI, to obtain an encoded vector sequence.

Step 14: Send the physical uplink channel.

The physical uplink channel is sent to a relay, or the physical uplink channel is sent to the base station.

Figure 5:
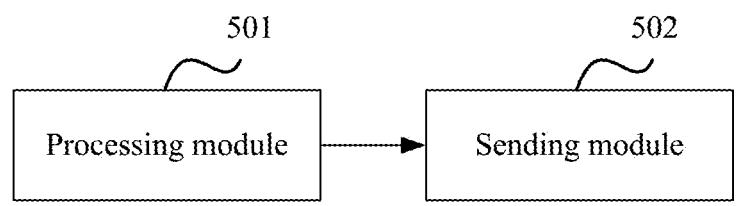
FIG. 5 is a schematic diagram 1 of structural composition of user equipment according to Embodiment 1 of the present invention.

Correspondingly, as shown in FIG. 5, Embodiment 1 of the present invention further provides user equipment. The user equipment can implement the foregoing method embodiment. Therefore, for specific content, refer to the descriptions in the foregoing embodiment. The user equipment includes a processing module 501 and a sending module 502.

The processing module 501 is configured to: obtain a resource occupied by first uplink control information UCI, and obtain a resource occupied by second UCI; perform channel encoding on the first UCI according to the resource occupied by the first UCI, to obtain an encoded bit sequence of the first UCI, and perform channel encoding on the second UCI according to the resource occupied by the second UCI, to obtain an encoded bit sequence of the second UCI. The first UCI includes CSI of a first report type and a hybrid automatic repeat request-acknowledgment message (HARQ-ACK), and the second UCI includes CSI of a second report type; or the first UCI includes a hybrid automatic repeat request-acknowledgment message (HARQ-ACK), and the second UCI includes CSI of a first report type and/or CSI of a second report type; and map the encoded bit sequence of the first UCI and the encoded bit sequence of the second UCI to a physical uplink channel.

The processing module 501 is configured to determine, according to one of the methods described in the foregoing embodiment, a quantity $Q'_1$ of modulation symbols occupied by the first UCI.

The processing module 501 is configured to obtain, in the following manner, a quantity $Q_1$ of encoded bits occupied by the first UCI:

$Q_1 = \lceil Q'*(O_1/(O_1+O_2)*\beta_{offset}\rceil$ or
$Q_1 = M_{sc}^{PUCCH}*N_{symb}^{UCI1}$.

The processing module 501 is configured to obtain, in the following manner, a quantity $Q_2$ of encoded bits occupied by the second UCI:

$Q_2 = Q - Q_1$ or $Q_2 = M_{sc}^{PUCCH}*N_{symb}^{UCI2}$, where $O_1$ is a quantity of information bits of the to-be-transmitted first UCI, $O_2$ is a quantity of information bits of the to-be-transmitted second UCI, $Q$ is a capacity of the physical uplink channel, $Q = M_{sc}^{PUCCH}*N_{symb}^{PUCCH}*Q_m$, $M_{sc}^{PUCCH}$ is a quantity of subcarriers allocated to the physical uplink channel, $M_{sc}^{PUCCH}=12*N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH}=(2 \cdot N_{symb}^{UL} - N_{DMRS} - N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, and $Q_m$ is a modulation order.

The processing module 501 is configured to obtain, in the following manner, a quantity of encoded bits occupied by the first UCI:

$Q_1 = Q'_1 * Q_m$

The processing module 501 is configured to obtain, in the following manner, a quantity of encoded bits occupied by the second UCI:

$Q_2 = Q'_2 * Q_m$, where $Q'_1$ is the quantity of modulation symbols occupied by the first UCI, $Q'_2$ is a quantity of modulation symbols occupied by the second UCI, and $Q_m$ is a modulation order.

The resource is a quantity of encoded bits. The processing module 501 is configured to: perform channel decoding on the first UCI according to a quantity of encoded bits occupied by the first UCI, to obtain the encoded bit sequence of the first UCI, and perform channel decoding on the second UCI according to a quantity of encoded bits occupied by the second UCI, to obtain the encoded bit sequence of the second UCI.

The processing module 501 is configured to obtain, in the following manner, the quantity $Q_1$ of encoded bits occupied by the first UCI:

$$Q_1 = \lceil Q'*(O_1/(O_1+O_2))*\beta_{offset}\rceil \text{ or}$$
$$Q_1 = M_{sc}^{PUCCH}*N_{symb}^{UCI1}.$$

The processing module 501 is configured to obtain, in the following manner, the quantity $Q_2$ of encoded bits occupied by the second UCI:

$$Q_2 = Q - Q_1 \text{ or } Q_2 = M_{sc}^{PUCCH}*N_{symb}^{UCI2}, \text{ where}$$

$O_1$ is a quantity of information bits of the to-be-transmitted first UCI, $O_2$ is a quantity of information bits of the to-be-transmitted second UCI, $Q$ is a capacity of the physical uplink channel, $Q = M_{sc}^{PUCCH}*N_{symb}^{PUCCH}*Q_m$, $M_{sc}^{PUCCH}$ is a quantity of subcarriers allocated to the physical uplink channel, $M_{sc}^{PUCCH}=12*N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH}=(2\cdot N_{symb}^{UL}-N_{DMRS}-N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, and $Q_m$ is a modulation order.

The first UCI obtained by the processing module 501 further includes a scheduling request (SR).

The CSI that is of the first report type and that is obtained by the processing module 501 includes at least one of the following: a type 3, a type 5, a type 6, a type 2a, or periodic CSI used for beam indication, and the CSI of the second report type includes at least one of the following: a type 2, a type 2b, a type 2c, a type 4, a type 1, or a type 1a.

The resource is a quantity of modulation symbols. The processing module 501 is configured to: obtain, according to a quantity of modulation symbols occupied by the first UCI, a quantity of encoded bits occupied by the first UCI, and obtain, according to a quantity of modulation symbols occupied by the second UCI, a quantity of encoded bits occupied by the second UCI; and perform channel encoding on the first UCI according to the quantity of encoded bits occupied by the first UCI, to obtain the encoded bit sequence of the first UCI, and perform channel encoding on the second UCI according to the quantity of encoded bits occupied by the second UCI, to obtain the encoded bit sequence of the second UCI.

The processing module 501 is configured to obtain, in the following manner, the quantity of encoded bits occupied by the first UCI:

$$Q_1 = Q'_1 * Q_m$$

The processing module 501 is configured to obtain, in the following manner, the quantity of encoded bits occupied by the second UCI:

$$Q_2 = Q'_2 * Q_m, \text{ where}$$

$Q'_1$ is the quantity of modulation symbols occupied by the first UCI, $Q'_2$ is the quantity of modulation symbols occupied by the second UCI, and $Q_m$ is a modulation order.

The resource is a quantity of encoded bits. The processing module 501 is configured to: perform channel encoding on the first UCI according to the quantity of encoded bits occupied by the first UCI, to obtain the encoded bit sequence of the first UCI, and perform channel encoding on the second UCI according to the quantity of encoded bits occupied by the second UCI, to obtain the encoded bit sequence of the second UCI.

The processing module 501 is configured to: convert the encoded bit sequence of the first UCI into an encoded vector sequence of the first UCI, and convert the encoded bit sequence of the second UCI into an encoded vector sequence of the second UCI; interleave the encoded vector sequence of the first UCI and the encoded vector sequence of the second UCI, to obtain an encoded bit sequence of UCI; and map the encoded bit sequence of the UCI to the physical uplink channel.

The processing module 501 is configured to: write the encoded vector sequence of the first UCI into a matrix row by row, write, row by row, the encoded vector sequence of the second UCI into a location, in the matrix, other than a location into which the encoded vector sequence of the first UCI is written; and sequentially read encoded bits in columns of the matrix column by column, to obtain the encoded bit sequence of the UCI.

The processing module 501 is configured to: modulate the encoded bit sequence of the first UCI and the encoded bit sequence of the second UCI, to obtain an encoded vector sequence, or modulate the encoded bit sequence of the first UCI and the encoded bit sequence of the second UCI, to obtain an encoded vector sequence of the first UCI and an encoded vector sequence of the second UCI respectively; and map the encoded vector sequence, or the encoded vector sequence of the first UCI and the encoded vector sequence of the second UCI to the physical uplink channel in a frequency domain-first and time domain-last manner or in a time domain-first and frequency domain-last manner.

The sending module 502 is configured to send the physical uplink channel.

Figure 6:
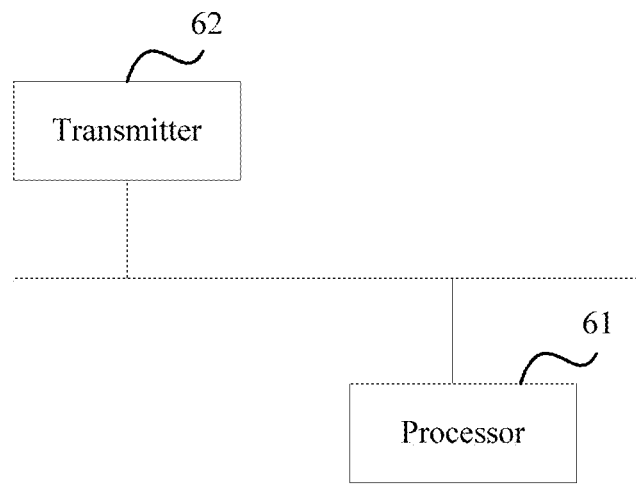
FIG. 6 is a schematic diagram 2 of structural composition of user equipment according to Embodiment 1 of the present invention.

Referring to FIG. 6, an embodiment of the present invention provides user equipment, and the user equipment includes a processor 61 and a transmitter 62.

The processor 61 is configured to: obtain a resource occupied by first uplink control information UCI, and obtain a resource occupied by second UCI; perform channel encoding on the first UCI according to the resource occupied by the first UCI, to obtain an encoded bit sequence of the first UCI, and perform channel encoding on the second UCI according to the resource occupied by the second UCI, to obtain an encoded bit sequence of the second UCI. The first UCI includes CSI of a first report type and a hybrid automatic repeat request-acknowledgment message (HARQ-ACK), and the second UCI includes CSI of a second report type; or the first UCI includes a hybrid automatic repeat request-acknowledgment message (HARQ-ACK), and the second UCI includes CSI of a first report type and/or CSI of a second report type; and map the encoded bit sequence of the first UCI and the encoded bit sequence of the second UCI to a physical uplink channel.

The transmitter 62 is configured to send the physical uplink channel.

It should be noted that the transmitter 62 may further perform another operation performed by the sending module 502 shown in FIG. 5, and the processor 61 may further perform another operation performed by the processing module 501 shown in FIG. 5.

The processor may be a central processing unit (CPU), or a combination of a CPU and a hardware chip.

The processor may be a network processor (NP), or a combination of a CPU and an NP, or a combination of an NP and a hardware chip.

The hardware chip may be one or a combination of a plurality of the following: an application-specific integrated circuit (ASIC), a field-programmable gate array (FPGA), or a complex programmable logical device (CPLD).

Embodiment 2

Figure 7:
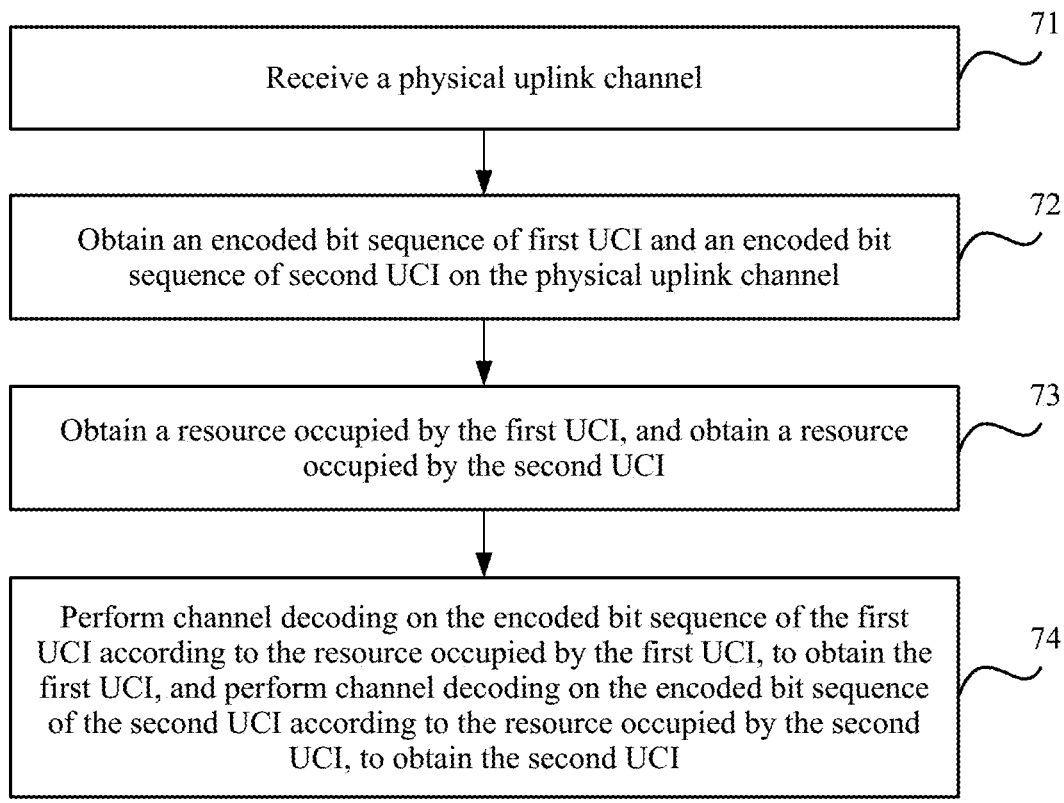
FIG. 7 is a flowchart of control information transmission receiving according to Embodiment 2 of the present invention.

Embodiment 2 of the present invention provides a control information receiving method. It should be noted that for same or corresponding content in this embodiment, refer to the foregoing descriptions. As shown in FIG. 7, a processing procedure of the method is specifically as follows.

Step 71: Receive a physical uplink channel.

Step 72: Obtain an encoded bit sequence of first UCI and an encoded bit sequence of second UCI on the physical uplink channel.

Step 73: Obtain a resource occupied by the first UCI, and obtain a resource occupied by the second UCI.

The first UCI is first CSI and a HARQ-ACK, or the first UCI is CSI of a first report type, a HARQ-ACK, and an SR. The second UCI is CSI of a second report type.

For a type of periodic CSI, refer to the foregoing descriptions.

In an optional implementation, in a technical solution provided in Embodiment 2 of the present invention, a performance requirement of a report type of the first UCI is higher than that of a report type of the second UCI. The report type of the first UCI may include at least one of a type 3, a type 5, a type 6, a type 2a, or periodic CSI corresponding to beam indication, and the report type of the second UCI may include at least one of a type 2, a type 2b, a type 2c, a type 4, a type 1, or a type 1a.

In this step, the resource occupied by the first UCI is obtained. The resource occupied by the first UCI may be a quantity of modulation symbols or a quantity of encoded bits. Correspondingly, the resource occupied by the second UCI may be a quantity of modulation symbols or a quantity of encoded bits. Detailed descriptions are separately provided below.

If the resources occupied by the first UCI and the second UCI are quantities of modulation symbols, the resources occupied by the first UCI and the second UCI may be obtained in the following manners.

Manner 1: Determine, according to Formula 1, a quantity $Q'_1$ of modulation symbols occupied by the first UCI:

$$Q'_1 = \lceil Q'*(O_1/(O_1+O_2))*\beta_{offset} \rceil \quad \text{Formula 1, where}$$

$O_1$ is a quantity of information bits of the to-be-transmitted first UCI, $O_2$ is a quantity of information bits of the to-be-transmitted second UCI, and $\beta_{offset}$ is a value semi-statically configured by using higher layer signaling or a predetermined value; and determine, according to Formula 2, a quantity $Q'_2$ of modulation symbols occupied by the second UCI:

$$Q'_2 = Q' - Q'_1 \quad \text{Formula 2}$$

In Formula 1 and Formula 2, $Q'_2$ is a capacity of the physical uplink channel, and may be determined according to Formula 3:

$$Q' = M_{sc}^{PUCCH} * N_{symb}^{PUCCH} \quad \text{Formula 3, where}$$

$M_{sc}^{PUCCH}$ is a quantity of subcarriers allocated to the physical uplink channel, and may be determined according to Formula 4, and $N_{symb}^{PUCCH}$ is a quantity of time domain symbols used to transmit uplink control information on the physical uplink channel, and may be determined according to Formula 5:

$$M_{sc}^{PUCCH} = 12 * N_{PRB} \quad \text{Formula 4; and}$$

$$N_{symb}^{PUCCH} = (2 \cdot N_{symb}^{UL} - N_{DMRS} - N_{SRS}) \quad \text{Formula 5, where}$$

$N_{symb}^{UL}$ is a quantity of time domain symbols occupied by the physical uplink channel in one timeslot, and $N_{DMRS}$ is a quantity of symbols used to transmit a DMRS pilot signal on the physical uplink channel in one subframe.

In Formula 1 to Formula 5, $O_1$ is the quantity of information bits of the to-be-transmitted first UCI, and $O_2$ is the quantity of information bits of the to-be-transmitted second UCI. When CRCs need to be attached to the first UCI and the second UCI, corresponding $O_1$ is an information length that is of the first UCI and that includes a length of a CRC, and corresponding $O_2$ is an information length that is of the second UCI and that includes a length of a CRC. For example, when uplink control information (a HARQ-ACK, CSI, and the like) is greater than 22 bits and is less than or equal to 119, a CRC is attached, and a length of the CRC is 8 bits; or when uplink control information is greater than 119, a CRC of 16 bits is attached. $O_1$ and $O_2$ herein each are a sum of a quantity of bits of the uplink control information and a quantity of bits of the CRC. When $O_2=0$, $\beta_{offset}=1$.

$N_{symb}^{UL}$ is the quantity of time domain symbols occupied by the physical uplink channel in one timeslot. In a normal cyclic prefix (CP) case, a value of N is 7, or in an extended CP case, a value of $N_{symb}^{UL}$ is 6. $N_{DMRS}$ is the quantity of symbols used to transmit a DMRS pilot signal on the physical channel in one subframe. When the physical uplink control channel is of a structure shown in FIG. 2, a value of $N_{DMRS}$ is 1, a value of $N_{SRS}$ is a quantity of time domain symbols used to transmit an SRS in the subframe. When an SRS is transmitted in a current subframe, a value of $N_{SRS}$ is 1, or when no SRS is transmitted in a current subframe, a value of $N_{symb}^{UL}$ is 0. For example, when the physical uplink channel is of a PUCCH format 3, a spread factor needs to be considered. $V_{SF}$ is a value of the spread factor (SF). Therefore, $Q' = M_{sc}^{PUCCH} * N_{symb}^{PUCCH} / V_{SF}$, a value of $V_{SF}$ is 5, and a value of $N_{DMRS}$ is 4. When the physical uplink channel is of a channel structure shown in FIG. 3, a value of $V_{SF}$ is 3, and a value of $N_{DMRS}$ is 2.

Manner 2: Determine, according to Formula 6, a quantity $Q'_1$ of modulation symbols occupied by the first UCI:

$$Q'_1 = \lceil Q'*(O_1/(O_1+O_2))*\beta_{offset} \rceil \quad \text{Formula 6; and}$$

determine, according to Formula 2, a quantity $Q'_2$ of modulation symbols occupied by the second UCI:

$$Q'_2 = Q' - Q'_1$$

For meanings of parameters in Formula 6, refer to the detailed descriptions in Formula 1 to Formula 5.

Manner 3: Determine, according to Formula 7, a quantity $Q'_1$ of modulation symbols occupied by the first UCI:

$$Q'_1 = M_{sc}^{PUCCH} * N_{symb}^{UCI1} \quad \text{Formula 7; and}$$

determine, according to Formula 8 or Formula 2, a quantity $Q'_2$ of modulation symbols occupied by the second UCI:

$$Q'_2 = M_{sc}^{PUCCH} * N_{symb}^{UCI1} \quad \text{Formula 8; or}$$

$$Q'_2 = Q' - Q'_1, \text{ where}$$

$N_{symb}^{UCI1}$ is a quantity of time domain symbols used to transmit the first UCI, and the value may be a value semi-statically notified by using higher layer signaling or may be a predetermined value, for example, the value is 4.

A meaning of a value of $M_{sc}^{PUCCH}$ is consistent with that in Manner 2, and details are not described herein again. A value of $Q'$ is consistent with a parameter in Manner 1, and details are not described herein again.

$$Q'_2 = M_{sc}^{PUCCH} * N_{symb}^{UCI2} \quad \text{Formula 8; or}$$

$$Q'_2 = Q' - Q'_1, \text{ where}$$

$N_{symb}^{UCI1}$ is a quantity of time domain symbols used to transmit the first UCI, and may be a value semi-statically notified using higher layer signaling or may be a predetermined value, for example, the value is 4. A value of $M_{sc}^{PUCCH}$ is consistent with that in Manner 2, and details are not described herein again. $Q'$ is consistent with that in Manner 1, and details are not described herein again. $N_{symb}^{UCI2}$ is the quantity of time domain symbols used to transmit the first UCI, and $N_{symb}^{UCI2}$ is a quantity of time domain symbols used to transmit the second UCI.

A quantity of encoded bits occupied by the first UCI is calculated according to the quantity of modulation symbols occupied by the first UCI, and a quantity of encoded bits occupied by the second UCI is calculated according to the quantity of modulation symbols occupied by the second UCI, including: calculating, according to a quantity of modulation symbols occupied by CSI of the first report type, the quantity of encoded bits occupied by the first UCI, and calculating, according to a quantity of modulation symbols occupied by CSI of the second report type, the quantity of encoded bits occupied by the second UCI.

If the resources occupied by the first UCI and the second UCI are quantities of encoded bits, the resources occupied by the first UCI and the second UCI may be obtained in the following manners.

Manner 1: Determine, according to Formula 9, a quantity $Q_1$ of encoded bits occupied by the first UCI:

$$Q'_1 = \lceil Q'*(O_1/(O_1+O_2))*\beta_{offset} \rceil \quad \text{Formula 9; and}$$

determine, according to Formula 10, a quantity $Q_2$ of encoded bits occupied by the second UCI:

$$Q'_2 = Q' - Q'_1 \quad \text{Formula 10}$$

Manner 2: Determine, according to Formula 11, a quantity $Q_1$ of encoded bits occupied by the first UCI:

$$Q'_1 = M_{sc}^{PUCCH} * N_{symb}^{UCI1} \quad \text{Formula 11; and}$$

determine, according to Formula 12, a quantity $Q_2$ of encoded bits occupied by the second UCI:

$$Q'_2 = M_{sc}^{PUCCH} * N_{symb}^{UCI2} \quad \text{Formula 12}$$

In Formula 9 to Formula 12, meanings of parameters are: $O_1$ is a quantity of information bits of the to-be-transmitted first UCI, and $O_2$ is a quantity of information bits of the to-be-transmitted second UCI. $Q$ is a capacity of the physical uplink channel, and may be determined according to Formula 13:

$$Q = M_{sc}^{PUCCH} * N_{symb}^{PUCCH} * Q_m \quad \text{Formula 13, where}$$

$M_{sc}^{PUCCH}$ is a quantity of subcarriers allocated to the physical uplink channel, $M_{sc}^{PUCCH} = 12 * N_{PRB}$, $N_{PRB}$ is a quantity of RBs allocated to the physical uplink channel, and $N_{symb}^{PUCCH}$ is a quantity of time domain symbols used to transmit uplink control information on the physical uplink channel, and may be determined according to Formula 14:

$$N_{symb}^{PUCCH} = (2 \cdot N_{symb}^{UL} - N_{DMRS} - N_{SRS}) \quad \text{Formula 14, where}$$

$N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, and $Q_m$ is a modulation order.

Manner 2: Determine, according to Formula 15, a quantity $Q_1$ of encoded bits occupied by the first UCI:

$$Q_1 = Q'_1 * Q_m \quad \text{Formula 15; and}$$

determine, according to Formula 16, a quantity $Q_2$ of encoded bits occupied by the second UCI:

$$Q_2 = Q'_2 * Q_m \quad \text{Formula 16}$$

In Formula 15 and Formula 16, $Q'_1$ is a quantity of modulation symbols occupied by the first UCI, $Q'_2$ is a quantity of modulation symbols occupied by the second UCI, and $Q_m$ is a modulation order.

Step 74: Perform channel decoding on the encoded bit sequence of the first UCI according to the resource occupied by the first UCI, to obtain the first UCI, and perform channel decoding on the encoded bit sequence of the second UCI according to the resource occupied by the second UCI, to obtain the second UCI.

The first UCI includes the CSI of the first report type and the HARQ-ACK, and the second UCI includes the CSI of the second report type; or the first UCI includes the HARQ-ACK, and the second UCI includes the CSI of the first report type and/or the CSI of the second report type.

The step of performing channel decoding on the first UCI according to the resource occupied by the first UCI, to obtain the first UCI, and performing channel decoding on the second UCI according to the resource occupied by the second UCI, to obtain the second UCI may be performed in the following two manners according to different resources.

Manner 1: When the resource is a quantity of modulation symbols, obtain, according to the resource occupied by the first UCI, modulation symbols corresponding to the first UCI on the physical uplink channel, and obtain, according to the resource occupied by the second UCI, modulation symbols corresponding to the second UCI on the physical uplink channel; and perform channel decoding on the first UCI according to the modulation symbols corresponding to the first UCI, to obtain the first UCI transmitted by UE, and perform channel decoding on the second UCI according to the modulation symbols corresponding to the second UCI, to obtain the second UCI transmitted by the UE.

If the resource is a quantity of modulation symbols, before channel encoding is separately performed on the first UCI and the second UCI, the quantity of encoded bits of the first UCI and the quantity of encoded bits of the second UCI are first calculated according to the obtained quantity of modulation symbols occupied by the first UCI and the obtained quantity of modulation symbols occupied by the second UCI. For details, refer to the detailed descriptions in the following formulas.

The quantity of encoded bits occupied by the first UCI is obtained in the following manner:

$$Q_1 = Q'_1 * Q_m; \text{ and}$$

the quantity of encoded bits occupied by the second UCI is obtained in the following manner:

$$Q_2 = Q'_2 * Q_m, \text{ where}$$

$Q$ is the quantity of modulation symbols occupied by the first UCI, $Q'_2$ is the quantity of modulation symbols occupied by the second UCI, and $Q_m$ is the modulation order.

Manner 2: When the resource is a quantity of encoded bits, perform channel decoding on the first UCI according to the quantity of encoded bits occupied by the first UCI, to obtain the encoded bit sequence of the first UCI, and perform channel decoding on the second UCI according to the quantity of encoded bits occupied by the second UCI, to obtain the encoded bit sequence of the second UCI.

For ease of description, in the technical solution provided in Embodiment 2 of the present invention, in the foregoing steps, detailed descriptions are provided according to an execution order of obtaining the resource occupied by the first UCI, and obtaining the resource occupied by the second UCI; and performing channel decoding on the first UCI according to the resource occupied by the first UCI, to obtain the first UCI, and performing channel decoding on the second UCI according to the resource occupied by the second UCI, to obtain the second UCI. In a specific implementation process, an execution order may be: obtaining the resource occupied by the first UCI, and performing channel decoding on the first UCI according to the resource occupied by the first UCI, to obtain the first UCI; and obtaining the resource occupied by the second UCI, and performing channel decoding on the second UCI according to the resource occupied by the second UCI, to obtain the second UCI; or an execution order may be: obtaining the resource occupied by the second UCI, and performing channel decoding on the second UCI according to the resource occupied by the second UCI, to obtain the second UCI; and obtaining the resource occupied by the first UCI, and performing channel decoding on the first UCI according to the resource occupied by the first UCI, to obtain the first UCI. For a specific implementation, refer to the detailed descriptions above, and details are not described herein again.

The performing channel decoding on the encoded bit sequence of the first UCI according to the resource occupied by the first UCI, to obtain the first UCI, and performing channel decoding on the encoded bit sequence of the second UCI according to the resource occupied by the second UCI, to obtain the second UCI includes: obtaining an encoded bit sequence of UCI on the physical uplink channel; de-interleaving the encoded bit sequence of the UCI, to obtain an encoded vector sequence of the first UCI and an encoded vector sequence of the second UCI; and converting the encoded vector sequence of the first UCI into the encoded bit sequence of the first UCI, and converting the encoded vector sequence of the second UCI into the encoded bit sequence of the second UCI.

The de-interleaving the encoded bit sequence of the UCI, to obtain an encoded vector sequence of the first UCI and an encoded vector sequence of the second UCI includes: sequentially reading encoded bits in columns of a matrix column by column, to obtain the encoded bit sequence of the UCI, obtaining the encoded vector sequence of the first UCI from the matrix row by row, and obtaining the encoded vector sequence of the second UCI from a location, in the matrix, other than a location from which the encoded vector sequence of the first UCI is obtained.

The obtaining an encoded bit sequence of first UCI and an encoded bit sequence of second UCI on the physical uplink channel includes: obtaining an encoded vector sequence, or an encoded vector sequence of the first UCI and an encoded vector sequence of the second UCI on the physical uplink channel in a time domain-first and frequency domain-last manner or in a frequency domain-first and time domain-last manner; and demodulating the encoded vector sequence, or demodulating the encoded vector sequence of the first UCI and the encoded vector sequence of the second UCI, to obtain the encoded bit sequence of the first UCI and the encoded bit sequence of the second UCI.

The performing channel decoding on the encoded bit sequence of the first UCI according to the resource occupied by the first UCI, to obtain the first UCI, and performing channel decoding on the encoded bit sequence of the second UCI according to the resource occupied by the second UCI, to obtain the second UCI is a processing process opposite to that in Embodiment 1. For details, refer to the detailed descriptions in Embodiment 1, and details are not described in Embodiment 2 of the present invention.

Figure 8:
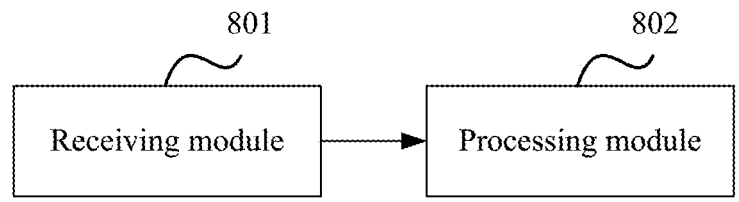
FIG. 8 is a schematic diagram 1 of structural composition of a network device according to Embodiment 2 of the present invention.

Correspondingly, Embodiment 2 of the present invention further provides a network device. As shown in FIG. 8, the network device includes a receiving module 801 and a processing module 802. The network device may perform corresponding operations in the foregoing method embodiment. Therefore, for same or corresponding content, refer to the foregoing descriptions.

The receiving module 801 is configured to receive a physical uplink channel.

The processing module 802 is configured to: obtain an encoded bit sequence of first UCI and an encoded bit sequence of second UCI on the physical uplink channel; obtain a resource occupied by the first uplink control information UCI, and obtain a resource occupied by the second UCI; and perform channel decoding on the encoded bit sequence of the first UCI according to the resource occupied by the first UCI, to obtain the first UCI, and perform channel decoding on the encoded bit sequence of the second UCI according to the resource occupied by the second UCI, to obtain the second UCI.

The first UCI includes CSI of a first report type and a hybrid automatic repeat request-acknowledgment message (HARQ-ACK), and the second UCI includes CSI of a second report type; or the first UCI includes a hybrid automatic repeat request-acknowledgment message (HARQ-ACK), and the second UCI includes CSI of a first report type and/or CSI of a second report type.

The resource is a quantity of modulation symbols. The processing module 802 is configured to: obtain, according to the resource occupied by the first UCI, modulation symbols corresponding to the first UCI on the physical uplink channel, and obtain, according to the resource occupied by the second UCI, modulation symbols corresponding to the second UCI on the physical uplink channel; and perform channel decoding on the first UCI according to the modulation symbols corresponding to the first UCI, to obtain the first UCI transmitted by UE, and perform channel decoding on the second UCI according to the modulation symbols corresponding to the second UCI, to obtain the second UCI transmitted by the UE.

The processing module 802 is specifically configured to: determine, in one of the following manners, a quantity $Q'_1$ of modulation symbols occupied by the first UCI:

$Q'_1 = \lceil Q'*(O_1/(O_1+O_2))*\beta_{offset} \rceil$;

$Q'_1 = M_{sc}^{PUCCH} * N_{symb}^{UCI1}$; or $Q'_1 = \lceil Q'*(O_1+O_2)*\beta_{offset} \rceil$; and determine, in one of the following manners, a quantity $Q'_2$ of modulation symbols occupied by the second UCI:

$Q'_2 = Q' - Q'_1$; or $Q'_2 = M_{sc}^{PUCCH} * N_{symb}^{UCI2}$; and $O_1$ is a quantity of information bits of the to-be-transmitted first UCI, $O_2$ is a quantity of information bits of the to-be-transmitted second UCI, $Q'$ is a capacity of the physical uplink channel, $Q' = M_{sc}^{PUCCH} * N_{symb}^{PUCCH}$, $M_{sc}^{PUCCH}$ is a quantity of subcarriers allocated to the physical uplink channel, $M_{sc}^{PUCCH} = 12*N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH}=(2 \cdot N_{symb}^{UL}-N_{DMRS}-N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, and $N_{symb}^{UCI2}$ is a quantity of time domain symbols used to transmit the second UCI.

The processing module 802 is configured to: obtain, in the following manner, a quantity of encoded bits occupied by the first UCI:

$$Q_1 = Q'_1 * Q_m; \text{ and}$$

obtain, in the following manner, a quantity of encoded bits occupied by the second UCI:

$$Q_2 = Q'_2 * Q_m, \text{ where}$$

$Q'_1$ is the quantity of modulation symbols occupied by the first UCI, $Q'_1$ is the quantity of modulation symbols occupied by the second UCI, and $Q_m$ is a modulation order.

The resource is a quantity of encoded bits. The processing module 802 is configured to: perform channel decoding on the first UCI according to a quantity of encoded bits occupied by the first UCI, to obtain the encoded bit sequence of the first UCI, and perform channel decoding on the second UCI according to a quantity of encoded bits occupied by the second UCI, to obtain the encoded bit sequence of the second UCI.

The processing module 802 is configured to: obtain, in the following manner, the quantity $Q_1$ of encoded bits occupied by the first UCI:

$$Q_1 = \lceil Q' * (O_1/(O_1+O_2)) * \beta_{offset} \rceil \text{ or}$$
$$Q_1 = M_{sc}^{PUCCH} * N_{symb}^{UCI1}; \text{ and}$$

obtain, in the following manner, the quantity $Q_2$ of encoded bits occupied by the second UCI:

$$Q_2 = Q - Q_1 \text{ or } Q_2 = M_{sc}^{PUCCH} * N_{symb}^{UCI2}, \text{ where}$$

$O_1$ is a quantity of information bits of the to-be-transmitted first UCI, $O_2$ is a quantity of information bits of the to-be-transmitted second UCI, $Q$ is a capacity of the physical uplink channel, $Q' = M_{sc}^{PUCCH} * N_{symb}^{PUCCH} * Q_m$, $M_{sc}^{PUCCH}$ is a quantity of subcarriers allocated to the physical uplink channel, $M_{sc}^{PUCCH} = 12 * N_{PRB}$, $N_{PRB}$ is a quantity of radio resource blocks RBs allocated to the physical uplink channel, $N_{symb}^{PUCCH}$ is a quantity of time domain symbols used to transmit uplink control information on the physical uplink channel, $N_{symb}^{PUCCH}=(2 \cdot N_{symb}^{UL}-N_{DMRS}-N_{SRS})$, $N_{symb}^{UL}$ is a quantity of time domain symbols occupied by the physical uplink channel in one timeslot, $N_{DMRS}$ is a quantity of symbols used to transmit a DMRS pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, and $Q_m$ is a modulation order.

The processing module 802 is configured to: obtain an encoded bit sequence of UCI on the physical uplink channel; de-interleave the encoded bit sequence of the UCI, to obtain an encoded vector sequence of the first UCI and an encoded vector sequence of the second UCI; and convert the encoded vector sequence of the first UCI into the encoded bit sequence of the first UCI, and convert the encoded vector sequence of the second UCI into the encoded bit sequence of the second UCI.

The processing module 802 is configured to: sequentially read encoded bits in columns of a matrix column by column, to obtain the encoded bit sequence of the UCI; obtain the encoded vector sequence of the first UCI from the matrix row by row; and obtain the encoded vector sequence of the second UCI from a location, in the matrix, other than a location from which the encoded vector sequence of the first UCI is obtained.

The processing module 802 is configured to: obtain an encoded vector sequence, or an encoded vector sequence of the first UCI and an encoded vector sequence of the second UCI on the physical uplink channel in a time domain-first and frequency domain-last manner or in a frequency domain-first and time domain-last manner; and demodulate the encoded vector sequence, or demodulate the encoded vector sequence of the first UCI and the encoded vector sequence of the second UCI, to obtain the encoded bit sequence of the first UCI and the encoded bit sequence of the second UCI.

Figure 9:
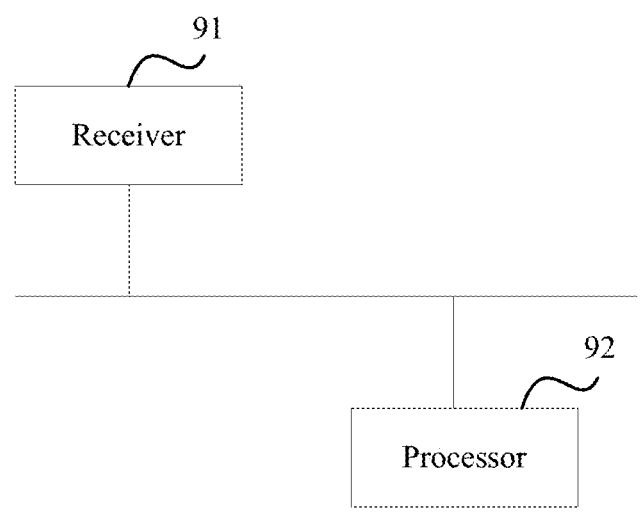
FIG. 9 is a schematic diagram 2 of structural composition of a network device according to Embodiment 2 of the present invention.

Referring to FIG. 9, an embodiment of the present invention provides a network device. The network device may be a relay, or may be a base station. The network device includes a receiver 91 and a processor 92.

The receiver 91 is configured to receive a physical uplink channel.

The processor 92 is configured to: obtain an encoded bit sequence of first UCI and an encoded bit sequence of second UCI on the physical uplink channel; obtain a resource occupied by the first uplink control information UCI, and obtain a resource occupied by the second UCI; and perform channel decoding on the encoded bit sequence of the first UCI according to the resource occupied by the first UCI, to obtain the first UCI, and perform channel decoding on the encoded bit sequence of the second UCI according to the resource occupied by the second UCI, to obtain the second UCI.

The first UCI includes CSI of a first report type and a hybrid automatic repeat request-acknowledgment message (HARQ-ACK), and the second UCI includes CSI of a second report type; or the first UCI includes a hybrid automatic repeat request-acknowledgment message (HARQ-ACK), and the second UCI includes CSI of a first report type and/or CSI of a second report type.

It should be noted that the receiver 91 may further perform another operation performed by the receiving module 801 shown in FIG. 8, and the processor 92 may further perform another operation performed by the processing module 801 shown in FIG. 8.

The processor may be a central processing unit (CPU), or a combination of a CPU and a hardware chip.

The processor may be a network processor (NP), or a combination of a CPU and an NP, or a combination of an NP and a hardware chip.

The hardware chip may be one or a combination of a plurality of the following: an application-specific integrated circuit (ASIC), a field-programmable gate array (FPGA), or a complex programmable logical device (CPLD).

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method, comprising:
    obtaining a first quantity $Q_1$ of encoded bits of resource occupied by first uplink control information (UCI), wherein the first UCI comprises a first part of channel state information (CSI) and a hybrid automatic repeat request-acknowledgment message (HARQ-ACK);
    obtaining a second quantity $Q_2$ of encoded bits of second UCI, wherein the second UCI comprises a second part of the CSI;
    jointly performing channel encoding on the first part of the CSI and the HARQ-ACK according to the first quantity $Q_1$ of encoded bits of the first UCI, to obtain an encoded bit sequence of the first UCI;
    independently performing channel encoding on the second part of the CSI according to the second quantity $Q_2$ of encoded bits of the second UCI, to obtain an encoded bit sequence of the second UCI;
    mapping the encoded bit sequence of the first UCI and the encoded bit sequence of the second UCI to a physical uplink channel; and
    sending the first UCI and the second UCI on the physical uplink channel;
    wherein the first quantity $Q_1$ of encoded bits of the first UCI satisfies one of the following relations:

$Q_1 = \lceil Q'^* (O_1/(O_1+O_2))^* \beta_{\textit{offset}} \rceil$; or $Q_1 = M_{sc}^{PUCCH} * N_{symb}^{UCI1}$; and wherein the second quantity $Q_2$ of encoded bits of the second UCI satisfies one of the following relations:

$Q_2 = Q' - Q_1$; or $Q_2 = M_{sc}^{PUCCH} * N_{symb}^{UCI2}$; and wherein $O_1$ is a quantity of information bits of the first UCI, $O_2$ is a quantity of information bits of the second UCI, $Q'$ is a capacity of the physical uplink channel, $Q' = M_{sc}^{PUCCH} * N_{symb}^{PUCCH} * Q_m$, $M_{sc}^{PUCCH}$ is a quantity of subcarriers allocated to the physical uplink channel, $M_{sc}^{PUCCH} = 12 * N_{PRB}$, $N_{PRB}$ is a quantity of radio resource blocks (RBs) allocated to the physical uplink channel, $N_{symb}^{PUCCH}$ is a quantity of time domain symbols used to transmit uplink control information on the physical uplink channel, $N_{symb}^{PUCCH} = (2 \cdot N_{symb}^{UL} - N_{DMRS} - N_{SRS})$, $N_{symb}^{UL}$ is a quantity of time domain symbols occupied by the physical uplink channel in one timeslot, $N_{DMRS}$ is a quantity of symbols used to transmit a demodulation reference signal (DMRS) pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, $Q_m$ is a modulation order, $\beta_{\textit{offset}}$ is a value semi-statically configured using higher layer signaling, or a predetermined value, and $N_{SRS}$ is a quantity of time domain symbols used to transmit a sounding reference signal (SRS) in the subframe.

2. The method according to claim 1, wherein mapping the encoded bit sequence of the first UCI and the encoded bit sequence of the second UCI to the physical uplink channel comprises:
    converting the encoded bit sequence of the first UCI into an encoded vector sequence of the first UCI;
    converting the encoded bit sequence of the second UCI into an encoded vector sequence of the second UCI;
    interleaving the encoded vector sequence of the first UCI and the encoded vector sequence of the second UCI, to obtain an encoded bit sequence of UCI; and
    mapping the encoded bit sequence of the UCI to the physical uplink channel.

3. The method according to claim 2, wherein interleaving the encoded vector sequence of the first UCI and the encoded vector sequence of the second UCI, to obtain the encoded bit sequence of UCI, comprises:
    writing the encoded vector sequence of the first UCI into a matrix row by row;
    writing, row by row, the encoded vector sequence of the second UCI into a location, in the matrix, other than a location into which the encoded vector sequence of the first UCI is written; and
    sequentially reading encoded bits in columns of the matrix column by column, to obtain the encoded bit sequence of the UCI.

4. The method according to claim 1, wherein mapping the encoded bit sequence of the first UCI and the encoded bit sequence of the second UCI to the physical uplink channel comprises:
modulating the encoded bit sequence of the first UCI and the encoded bit sequence of the second UCI, to obtain an encoded vector sequence, or modulating the encoded bit sequence of the first UCI and the encoded bit sequence of the second UCI, to obtain an encoded vector sequence of the first UCI and an encoded vector sequence of the second UCI respectively; and
mapping the encoded vector sequence, or the encoded vector sequence of the first UCI and the encoded vector sequence of the second UCI, to the physical uplink channel in a frequency domain-first and time domain-last manner or in a time domain-first and frequency domain-last manner.

5. An apparatus, comprising:
a processor; and
a non-transitory computer-readable storage medium storing a program to be executed by the processor, the program including instructions for:
obtaining a first quantity $Q_1$ of encoded bits of first uplink control information (UCI), wherein the first UCI comprises a first part of channel state information (CSI) and a hybrid automatic repeat request-acknowledgment message (HARQ-ACK);
obtaining a second quantity $Q_2$ of encoded bits of second UCI, wherein the second UCI comprises a second part of the CSI;
jointly performing channel encoding on the first part of the CSI and the HARQ-ACK according to the first quantity $Q_1$ of encoded bits of the first UCI, to obtain an encoded bit sequence of the first UCI; and
independently performing channel encoding on the second part of the CSI according to the second quantity $Q_2$ of encoded bits of the second UCI, to obtain an encoded bit sequence of the second UCI; and
mapping the encoded bit sequence of the first UCI and the encoded bit sequence of the second UCI to a physical uplink channel;
wherein the first quantity $Q_1$ of encoded bits of the first UCI satisfies one of the following relations:

$Q_1 = \lceil Q'^*(O_1/(O_1+O_2))^*\beta_{offset} \rceil$; or $Q_1 = M_{sc}^{PUCCH} * N_{symb}^{UCI1}$; and wherein the second quantity $Q_2$ of encoded bits of the second UCI satisfies one of the following relations:

$Q_2 = Q' - Q_1$; or $Q_2 = M_{sc}^{PUCCH} * N_{symb}^{UCI2}$; and wherein $O_1$ is a quantity of information bits of the first UCI, $O_2$ is a quantity of information bits of the second UCI, $Q'$ is a capacity of the physical uplink channel, $Q' = M_{sc}^{PUCCH} * N_{symb}^{PUCCH} * Q_m$, $M_{sc}^{PUCCH}$ is a quantity of subcarriers allocated to the physical uplink channel, $M_{sc}^{PUCCH} = 12 * N_{PRB}$, $N_{PRB}$ is a quantity of radio resource blocks (RBs) allocated to the physical uplink channel, $N_{symb}^{PUCCH}$ is a quantity of time domain symbols used to transmit uplink control information on the physical uplink channel, $N_{symb}^{PUCCH} = (2 \cdot N_{symb}^{UL} - N_{DMRS} - N_{SRS})$, $N_{symb}^{UL}$ is a quantity of time domain symbols occupied by the physical uplink channel in one timeslot, $N_{DMRS}$ is a quantity of symbols used to transmit a demodulation reference signal (DMRS) pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, $Q_m$ is a modulation order, $\beta_{offset}$ is a value semi-statically configured using higher layer signaling, or a predetermined value, and $N_{SRS}$ is a quantity of time domain symbols used to transmit a sounding reference signal (SRS) in the subframe.

6. The apparatus according to claim 5, wherein the program further includes instructions for:
converting the encoded bit sequence of the first UCI into an encoded vector sequence of the first UCI; and
converting the encoded bit sequence of the second UCI into an encoded vector sequence of the second UCI;
interleaving the encoded vector sequence of the first UCI and the encoded vector sequence of the second UCI, to obtain an encoded bit sequence of UCI; and
mapping the encoded bit sequence of the UCI to the physical uplink channel.

7. The apparatus according to claim 6, wherein the program further includes instructions for:
writing the encoded vector sequence of the first UCI into a matrix row by row;
writing, row by row, the encoded vector sequence of the second UCI into a location, in the matrix, other than a location into which the encoded vector sequence of the first UCI is written; and
sequentially reading encoded bits in columns of the matrix column by column, to obtain the encoded bit sequence of the UCI.

8. The apparatus according to claim 5, wherein the program further includes instructions for:
modulating the encoded bit sequence of the first UCI and the encoded bit sequence of the second UCI to obtain an encoded vector sequence, or modulating the encoded bit sequence of the first UCI and the encoded bit sequence of the second UCI, to obtain an encoded vector sequence of the first UCI and an encoded vector sequence of the second UCI respectively; and
mapping the encoded vector sequence, or the encoded vector sequence of the first UCI and the encoded vector sequence of the second UCI, to the physical uplink channel in a frequency domain-first and time domain-last manner or in a time domain-first and frequency domain-last manner.

9. A non-transitory computer readable medium comprising a computer program code containing one or more executable instructions that are executable by a processor of a terminal device, wherein the executable instructions comprise instructions for:
obtaining a first quantity $Q_1$ of encoded bits of first uplink control information (UCI), wherein the first UCI comprises a first part of channel state information (CSI) and a hybrid automatic repeat request-acknowledgment message (HARQ-ACK);
obtaining a second quantity $Q_2$ of encoded bits of second UCI, wherein the second UCI comprises a second part of the CSI;
jointly performing channel encoding on the first part of the CSI and the HARQ-ACK according to the first quantity $Q_1$ of encoded bits of the first UCI, to obtain an encoded bit sequence of the first UCI;
independently performing channel encoding on the second part of the CSI according to the second quantity $Q_2$ of encoded bits of the second UCI, to obtain an encoded bit sequence of the second UCI;

mapping the encoded bit sequence of the first UCI and the encoded bit sequence of the second UCI to a physical uplink channel; and sending the first UCI and the second UCI on the physical uplink channel;

wherein the first quantity $Q_1$ of encoded bits of the first UCI satisfies one of the following relations:

$$Q_1 = \lceil Q'^*(O_1/(O_1+O_2))^*\beta_{offset} \rceil; \text{ or}$$

$$Q_1 = M_{sc}^{PUCCH} * N_{symb}^{UCI1}; \text{ and}$$

wherein the second quantity $Q_2$ of encoded bits of the second UCI satisfies one of the following relations:

$$Q_2 = Q' - Q_1; \text{ or}$$

$$Q_2 = M_{sc}^{PUCCH} * N_{symb}^{UCI2}; \text{ and}$$

wherein $O_1$ is a quantity of information bits of the first UCI, $O_2$ is a quantity of information bits of the second UCI, $Q'$ is a capacity of the physical uplink channel, $Q' = M_{sc}^{PUCCH} * N_{symb}^{PUCCH} * Q_m$, $M_{sc}^{PUCCH}$ is a quantity of subcarriers allocated to the physical uplink channel, $M_{sc}^{PUCCH} = 12 * N_{PRB}$, $N_{PRB}$ is a quantity of radio resource blocks (RBs) allocated to the physical uplink channel, $N_{symb}^{PUCCH}$ is a quantity of time domain symbols used to transmit uplink control information on the physical uplink channel, $N_{symb}^{PUCCH} = (2 \cdot N_{symb}^{UL} - N_{DMRS} - N_{SRS})$, $N_{symb}^{UL}$ is a quantity of time domain symbols occupied by the physical uplink channel in one timeslot, $N_{DMRS}$ is a quantity of symbols used to transmit a demodulation reference signal (DMRS) pilot signal on the physical uplink channel in one subframe, $N_{symb}^{UCI1}$ is a quantity of time domain symbols used to transmit the first UCI, $N_{symb}^{UCI2}$ is a quantity of time domain symbols used to transmit the second UCI, $Q_m$ is a modulation order, $\beta_{offset}$ is a value semi-statically configured using higher layer signaling, or a predetermined value, and $N_{SRS}$ is a quantity of time domain symbols used to transmit a sounding reference signal (SRS) in the subframe.

10. The non-transitory computer readable medium according to claim 9, wherein mapping the encoded bit sequence of the first UCI and the encoded bit sequence of the second UCI to the physical uplink channel comprises:

converting the encoded bit sequence of the first UCI into an encoded vector sequence of the first UCI;

converting the encoded bit sequence of the second UCI into an encoded vector sequence of the second UCI;

interleaving the encoded vector sequence of the first UCI and the encoded vector sequence of the second UCI, to obtain an encoded bit sequence of UCI; and mapping the encoded bit sequence of the UCI to the physical uplink channel.

11. The non-transitory computer readable medium according to claim 10, wherein interleaving the encoded vector sequence of the first UCI and the encoded vector sequence of the second UCI, to obtain the encoded bit sequence of UCI, comprises:

writing the encoded vector sequence of the first UCI into a matrix row by row;

writing, row by row, the encoded vector sequence of the second UCI into a location, in the matrix, other than a location into which the encoded vector sequence of the first UCI is written; and sequentially reading encoded bits in columns of the matrix column by column, to obtain the encoded bit sequence of the UCI.

12. The non-transitory computer readable medium according to claim 9, wherein mapping the encoded bit sequence of the first UCI and the encoded bit sequence of the second UCI to the physical uplink channel comprises:

modulating the encoded bit sequence of the first UCI and the encoded bit sequence of the second UCI, to obtain an encoded vector sequence, or modulating the encoded bit sequence of the first UCI and the encoded bit sequence of the second UCI, to obtain an encoded vector sequence of the first UCI and an encoded vector sequence of the second UCI respectively; and mapping the encoded vector sequence, or the encoded vector sequence of the first UCI and the encoded vector sequence of the second UCI, to the physical uplink channel in a frequency domain-first and time domain-last manner or in a time domain-first and frequency domain-last manner.

13. The method according to claim 1, wherein the first quantity $Q_1$ of encoded bits of the first UCI satisfies the following relation:

$$Q_1 = \lceil Q'^*(O_1/(O_1+O_2))^*\beta_{offset} \rceil.$$

14. The method according to claim 1, wherein the first quantity $Q_1$ of encoded bits of the first UCI satisfies the following relation:

$$Q_1 = M_{sc}^{PUCCH} * N_{symb}^{UCI1}.$$

15. The method according to claim 1, wherein the second quantity $Q_2$ of encoded bits of the second UCI satisfies the following relation:

$$Q_2 = Q' - Q_1.$$

16. The method according to claim 1, wherein the second quantity $Q_2$ of encoded bits of the second UCI satisfies the following relation:

$$Q_2 = M_{sc}^{PUCCH} * N_{symb}^{UCI2}.$$

17. The apparatus according to claim 5, wherein the first quantity $Q_1$ of encoded bits of the first UCI satisfies the following relation:

$$Q_1 = \lceil Q'^*(O_1/(O_1+O_2))^*\beta_{offset} \rceil.$$

18. The apparatus according to claim 5, wherein the first quantity $Q_1$ of encoded bits of the first UCI satisfies the following relation:

$$Q_1 = M_{sc}^{PUCCH} * N_{symb}^{UCI1}.$$

19. The apparatus according to claim 5, wherein the second quantity $Q_2$ of encoded bits of the second UCI satisfies the following relation:

$$Q_2 = Q' - Q_1.$$

20. The apparatus according to claim 5, wherein the second quantity $Q_2$ of encoded bits of the second UCI satisfies the following relation:

$$Q_2 = M_{sc}^{PUCCH} * N_{symb}^{UCI2}.$$

21. The non-transitory computer readable medium according to claim 9, wherein the first quantity $Q_1$ of encoded bits of the first UCI satisfies the following relation:

$$Q_1 = \lceil Q'^*(O_1/(O_1+O_2))^*\beta_{offset} \rceil.$$

22. The non-transitory computer readable medium according to claim 9, wherein the first quantity $Q_1$ of encoded bits of the first UCI satisfies the following relation:

$$Q_1 = M_{sc}^{PUCCH} * N_{symb}^{UCI1}.$$

23. The non-transitory computer readable medium according to claim 9, wherein the second quantity $Q_2$ of encoded bits of the second UCI satisfies the following relation:

$$Q_2 = Q' - Q_1.$$

24. The non-transitory computer readable medium according to claim 9, wherein the second quantity $Q_2$ of encoded bits of the second UCI satisfies the following relation:

$$Q_2 = M_{sc}^{PUCCH} * N_{symb}^{UCI2}.$$

* * * * *